(12) United States Patent
Shila Chew et al.

(10) Patent No.: US 12,608,723 B2
(45) Date of Patent: Apr. 21, 2026

(54) METHOD AND SYSTEM OF ACCESSING DATA AMONG A PLURALITY OF LOYALTY PROGRAMS

(71) Applicant: MASTERCARD ASIA/PACIFIC PTE. LTD., Singapore (SG)

(72) Inventors: Shi Ler Shila Chew, Singapore (SG); Donghao Huang, Singapore (SG); Gerald Ng, Singapore (SG); Ian Quek, Singapore (SG); Phuoc Hoang Long Le, Singapore (SG); Srinath Ravinathan, Singapore (SG); Than Htike Aung, Singapore (SG)

(73) Assignee: MASTERCARD ASIA/PACIFIC PTE. LTD., Singapore (SG)

( * ) Notice: Subject to any disclaimer, the term of this patent is extended or adjusted under 35 U.S.C. 154(b) by 0 days.

(21) Appl. No.: 18/594,333

(22) Filed: Mar. 4, 2024

(65) Prior Publication Data

US 2025/0278756 A1     Sep. 4, 2025

(51) Int. Cl.
| | |
|---|---|
| *G06Q 30/02* | (2023.01) |
| *G06Q 30/0226* | (2023.01) |
| *H04L 9/00* | (2022.01) |
| *H04L 67/306* | (2022.01) |

(52) U.S. Cl.
CPC ........... *G06Q 30/0226* (2013.01); *H04L 9/50* (2022.05); *H04L 67/306* (2013.01)

(58) Field of Classification Search
CPC ...... G06Q 30/0226; H04L 9/50; H04L 67/306
See application file for complete search history.

(56) References Cited

U.S. PATENT DOCUMENTS

| | | | |
|---|---|---|---|
| 11,514,469 B2 * | 11/2022 | Clark | ................. G06Q 30/0239 |
| 11,689,355 B2 | 6/2023 | Davis | |
| 2007/0198338 A1 | 8/2007 | Heywood | |
| 2011/0251882 A1 | 10/2011 | Richard | |

(Continued)

OTHER PUBLICATIONS

University of Chicago, "Too Many Metrics", Kaitlin SpringMeier (Year: 2016).*

(Continued)

*Primary Examiner* — Breffni Baggot
(74) *Attorney, Agent, or Firm* — Panitch Schwarze Belisario & Nadel LLP

(57) ABSTRACT

A method for exchanging loyalty points includes storing one or more user loyalty profiles including a user identifier and one or more merchant identifiers associated with a loyalty point total; receiving a transaction request from a computing system including at least a user identification, a merchant identification, and a transaction amount; identifying a user loyalty profile including a user identifier that matches the user identification; in response to identifying the user loyalty profile, determining the merchant identification matches one of the one or more merchant identifiers; determining the loyalty point total associated with the matching merchant identifier is lower than a loyalty point total required to cover the transaction amount; and exchanging a first amount of loyalty points associated with a different merchant identifier of the one or more merchant identifiers for a second amount of loyalty points associated with the merchant identifier that matched the merchant identification.

20 Claims, 14 Drawing Sheets

(56)                    References Cited

U.S. PATENT DOCUMENTS

| | | | | |
|---|---|---|---|---|
| 2012/0191525 A1* | 7/2012 | Singh | ................... | G06Q 20/405 |
| | | | | 705/14.27 |
| 2017/0293926 A1* | 10/2017 | Clark | ................... | G06Q 20/381 |
| 2017/0293930 A1* | 10/2017 | Clark | ................. | G06Q 30/0234 |
| 2017/0293931 A1* | 10/2017 | Clark | ................. | G06Q 30/0207 |
| 2017/0293932 A1* | 10/2017 | Clark | ................... | H04L 67/306 |
| 2020/0126107 A9* | 4/2020 | Shah | ................. | G06Q 30/0229 |
| 2023/0385866 A1 | 11/2023 | Chan et al. | | |

OTHER PUBLICATIONS

Notification of Transmittal of the International Search Report and the Written Opinion of the International Searching Authority, or the Declaration, dated Jun. 4, 2025 issued in corresponding International Application No. PCT/SG2025/050135, 13 pages.

\* cited by examiner

600

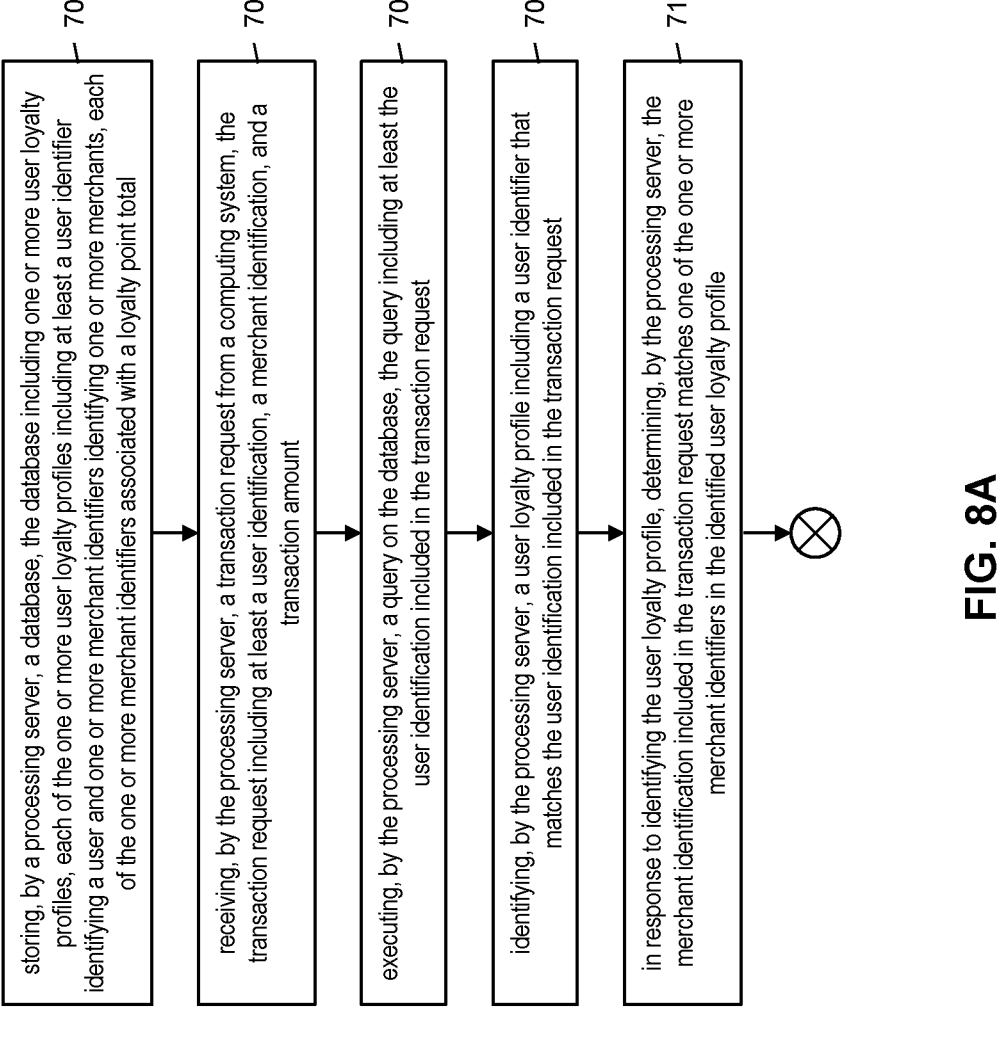

700 storing, by a processing server, a database, the database including one or more user loyalty profiles, each of the one or more user loyalty profiles including at least a user identifier identifying a user and one or more merchant identifiers identifying one or more merchants, each of the one or more merchant identifiers associated with a loyalty point total

702 receiving, by the processing server, a transaction request from a computing system, the transaction request including at least a user identification, a merchant identification, and a transaction amount

704 executing, by the processing server, a query on the database, the query including at least the user identification included in the transaction request

706 identifying, by the processing server, a user loyalty profile including a user identifier that matches the user identification included in the transaction request

708 in response to identifying the user loyalty profile, determining, by the processing server, the merchant identification included in the transaction request matches one of the one or more merchant identifiers in the identified user loyalty profile

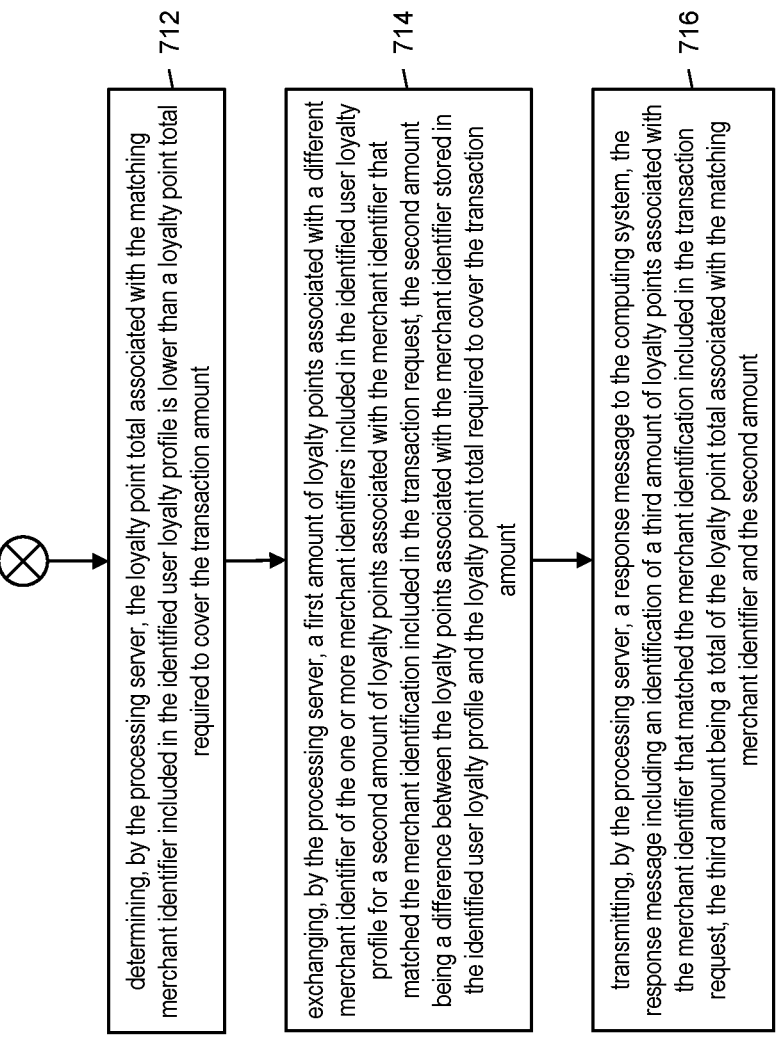

determining, by the processing server, the loyalty point total associated with the matching merchant identifier included in the identified user loyalty profile is lower than a loyalty point total required to cover the transaction amount
— 712 exchanging, by the processing server, a first amount of loyalty points associated with a different merchant identifier of the one or more merchant identifiers included in the identified user loyalty profile for a second amount of loyalty points associated with the merchant identifier that matched the merchant identification included in the transaction request, the second amount being a difference between the loyalty points associated with the merchant identifier stored in the identified user loyalty profile and the loyalty point total required to cover the transaction amount
— 714 transmitting, by the processing server, a response message to the computing system, the response message including an identification of a third amount of loyalty points associated with the merchant identifier that matched the merchant identification included in the transaction request, the third amount being a total of the loyalty point total associated with the matching merchant identifier and the second amount
— 716

FIG. 8B

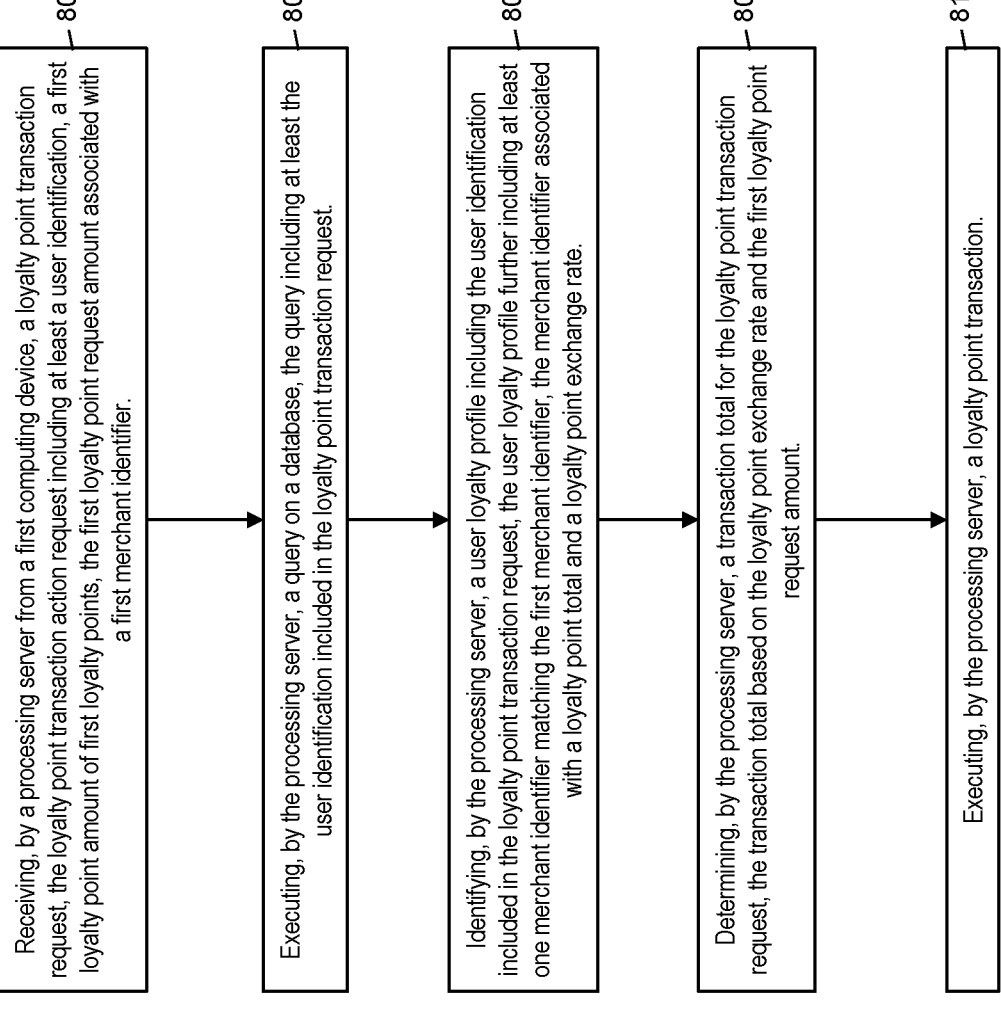

800

Receiving, by a processing server from a first computing device, a loyalty point transaction request, the loyalty point transaction action request including at least a user identification, a first loyalty point amount of first loyalty points, the first loyalty point request amount associated with a first merchant identifier.

802

Executing, by the processing server, a query on a database, the query including at least the user identification included in the loyalty point transaction request.

804

Identifying, by the processing server, a user loyalty profile including the user identification included in the loyalty point transaction request, the user loyalty profile further including at least one merchant identifier matching the first merchant identifier, the merchant identifier associated with a loyalty point total and a loyalty point exchange rate.

806

Determining, by the processing server, a transaction total for the loyalty point transaction request, the transaction total based on the loyalty point exchange rate and the first loyalty point request amount.

808

Executing, by the processing server, a loyalty point transaction.

METHOD AND SYSTEM OF ACCESSING DATA AMONG A PLURALITY OF LOYALTY PROGRAMS

FIELD

The present disclosure relates to the exchange of loyalty points, specifically the exchange of loyalty points among a plurality of loyalty programs.

BACKGROUND

Presently, many merchants have loyalty programs through which customers can earn rewards such as loyalty points that can be redeemed with the merchants. For example, a customer may earn a loyalty point for every dollar they spend with a merchant, e.g., online or in a brick-and-mortar location, and the customer may later redeem those loyalty points for cash back, a discount, or any other rewards offered by the merchant. Today, the average customer has sixteen loyalty memberships but is active with less than half of those memberships. With sporadic spending, customer loyalty points are often scattered across different loyalty providers, e.g., different merchants. In addition, there is often a lack of interoperability between different loyalty providers, e.g., one merchant does not accept the loyalty points of another merchant. As such, there are often unused loyalty points which expire, hence reducing engagement between consumers and merchants. The majority of merchant loyalty platforms are powered by a centralized entity/platform (e.g., Shopback™) and should merchants wish to enable interoperability between their loyalty programs, the implementation cost would be pretty high causing such interoperability to be unprofitable. Thus, there is a need for a technological solution to where a customer can exchange loyalty points of one merchant for loyalty points of another merchant.

SUMMARY

The present disclosure provides a novel technical solution description of systems and methods for exchanging loyalty points. Particularly, exemplary embodiments of the methods, systems, and computer program products provided for herein enable the exchange of loyalty points associated with one or more merchants to be exchanged for loyalty points of one or more other merchants. For example, a customer may have a need to obtain loyalty points for merchant A, but they may only have loyalty points with merchant B. Exemplary embodiments of the methods, systems, and computer program products provided for herein enable the customer to exchange their loyalty points with merchant B for loyalty points of merchant A. Further, the customer may have loyalty points with a plurality of merchants, e.g., merchant B and merchant C. Embodiments of the methods, systems, and computer program products provided for herein enable the customer to exchange a combination of their loyalty points with merchant B and merchant C for loyalty points of merchant A. Additionally, exemplary embodiments of the methods, systems, and computer program products provided for herein enable a customer to exchange loyalty points for a specific merchant using any suitable payment method, e.g., a payment card, cryptocurrency, etc. The embodiments disclosed herein enable the exchange of loyalty points via an exchange, which can be a peer-to-peer exchange or a decentralized exchange. Thus, the methods, systems, and computer program products provided for herein provide a novel way for exchanging loyalty points of different loyalty programs via an exchange.

A method for exchanging loyalty points includes: storing, by a processing server, a database, the database including one or more user loyalty profiles, each of the one or more user loyalty profiles including at least a user identifier identifying a user and one or more merchant identifiers identifying one or more merchants, each of the one or more merchant identifiers associated with a loyalty point total; receiving, by the processing server, a transaction request from a computing system, the transaction request including at least a user identification, a merchant identification, and a transaction amount; executing, by the processing server, a query on the database, the query including at least the user identification included in the transaction request; identifying, by the processing server, a user loyalty profile including a user identifier that matches the user identification included in the transaction request; in response to identifying the user loyalty profile, determining, by the processing server, the merchant identification included in the transaction request matches one of the one or more merchant identifiers in the identified user loyalty profile; determining, by the processing server, the loyalty point total associated with the matching merchant identifier included in the identified user loyalty profile is lower than a loyalty point total required to cover the transaction amount; exchanging, by the processing server, a first amount of loyalty points associated with a different merchant identifier of the one or more merchant identifiers included in the identified user loyalty profile for a second amount of loyalty points associated with the merchant identifier that matched the merchant identification included in the transaction request, the second amount being a difference between the loyalty points associated with the merchant identifier stored in the identified user loyalty profile and the loyalty point total required to cover the transaction amount; and transmitting, by the processing server, a response message to the computing system, the response message including an identification of a third amount of loyalty points associated with the merchant identifier that matched the merchant identification included in the transaction request, the third amount being a total of the loyalty point total associated with the matching merchant identifier and the second amount.

A system for exchanging loyalty points includes: a computing system; and a processing server, the processing server configured to: store a database, the database including one or more user loyalty profiles, each of the one or more user loyalty profiles including at least a user identifier identifying a user and one or more merchant identifiers identifying one or more merchants, each of the one or more merchant identifiers associated with a loyalty point total; receive a transaction request from a first computing system, the transaction request including at least a user identification, a merchant identification, and a transaction amount; execute a query on the database, the query including at least the user identification included in the transaction request; identify a user loyalty profile including a user identifier that matches the user identification included in the transaction request; in response to identifying the user loyalty profile, determine the merchant identification included in the transaction request matches one of the one or more merchant identifiers in the identified user loyalty profile; determine the loyalty point total associated with the matching merchant identifier included in the identified user loyalty profile is lower than a loyalty point total required to cover the transaction amount; exchange a first amount of loyalty points associated with a different merchant identifier of the one or more merchant identifiers included in the identified user loyalty profile for a second amount of loyalty points associated with the merchant identifier that matched the merchant identification included in the transaction request, the second amount being a difference between the loyalty points associated with the merchant identifier stored in the identified user loyalty profile and the loyalty point total required to cover the transaction amount; and transmit a response message to the first computing system, the response message including an identification of a third amount of loyalty points associated with the merchant identifier that matched the merchant identification included in the transaction request, the third amount being a total of the loyalty point total associated with the matching merchant identifier and the second amount.

A method for exchanging loyalty points includes: receiving, by a processing server from a first computing device, a loyalty point transaction request, the loyalty point transaction action request including at least a user identification, a first loyalty point amount of first loyalty points, the first loyalty point request amount associated with a first merchant identifier; executing, by the processing server, a query on a database, the query including at least the user identification included in the loyalty point transaction request; identifying, by the processing server, a user loyalty profile including the user identification included in the loyalty point transaction request, the user loyalty profile further including at least one merchant identifier matching the first merchant identifier, the merchant identifier associated with a loyalty point total and a loyalty point exchange rate; determining, by the processing server, a transaction total for the loyalty point transaction request, the transaction total based on the loyalty point exchange rate and the first loyalty point request amount; and executing, by the processing server, a loyalty point transaction, wherein executing the loyalty point transaction includes: transmitting, by the processing server to the first computing device, the first loyalty points equal the first loyalty point request amount, and transmitting, by the processing server to the second computing device, a transaction amount equal to the transaction total.

A system for exchanging loyalty points includes: a first computing system; a second computing system; and a processing server, the processing server configured to: receive, from a first computing device, a loyalty point transaction request, the loyalty point transaction action request including at least a user identification, a first loyalty point amount of first loyalty points, the first loyalty point request amount associated with a first merchant identifier; execute a query on a database, the query including at least the user identification included in the loyalty point transaction request; identify a user loyalty profile including the user identification included in the loyalty point transaction request, the user loyalty profile further including at least one merchant identifier matching the first merchant identifier, the merchant identifier associated with a loyalty point total and a loyalty point exchange rate; determine a transaction total for the loyalty point transaction request, the transaction total based on the loyalty point exchange rate and the first loyalty point request amount; and execute a loyalty point transaction, wherein executing the loyalty point transaction includes: transmit, to the first computing device, the first loyalty points equal the first loyalty point request amount, and transmit, to the second computing device, a transaction amount equal to the transaction total.

BRIEF DESCRIPTION OF THE DRAWING FIGURES

The scope of the present disclosure is best understood from the following detailed description of exemplary embodiments when read in conjunction with the accompanying drawings. Included in the drawings are the following figures:

FIGS. 8A-8B is a flow chart illustrating an exemplary method for exchanging loyalty points in accordance with exemplary embodiments;

FIG. 9 is a flow chart illustrating an exemplary method for exchanging loyalty points in accordance with exemplary embodiments.

Further areas of applicability of the present disclosure will become apparent from the detailed description provided hereinafter. It should be understood that the detailed description of exemplary embodiments is intended for illustration purposes only and is, therefore, not intended to necessarily limit the scope of the disclosure.

DETAILED DESCRIPTION

System for Exchanging Loyalty Points

Figure 1:
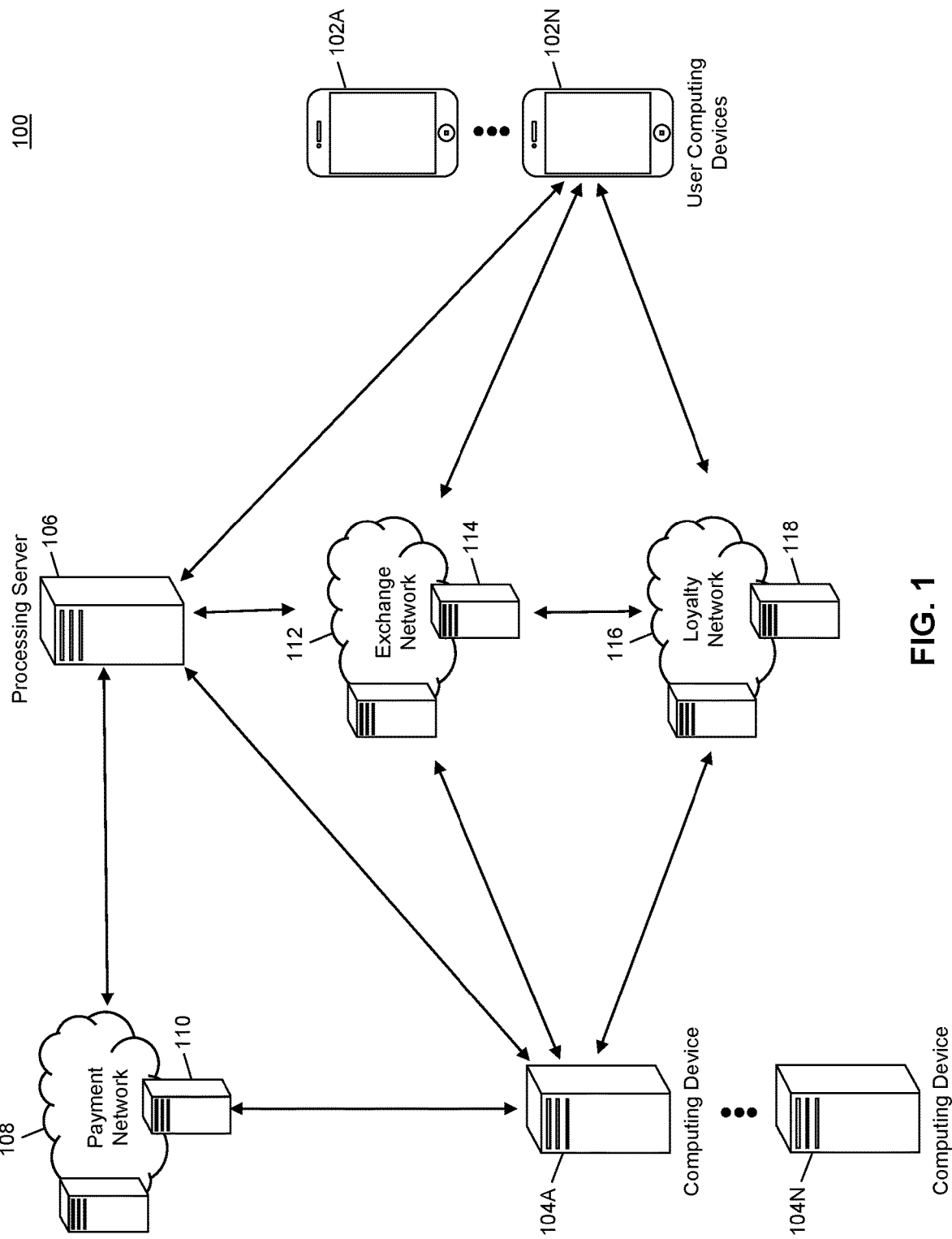
FIG. 1 is a block diagram illustrating a high-level system architecture for exchanging loyalty points in accordance with exemplary embodiments.

FIG. 1 illustrates a system 100 for exchanging loyalty points. The system 100 can include one or more user devices 102A-N, one or more computing devices 104A-N, processing server 106, payment network 108, exchange network 112, and loyalty network 116. The processing server 106, discussed in more detail below, can be configured to enable the exchange of loyalty points via the exchange network 112.

The user computing devices 102A-N may be a desktop computer, a notebook, a laptop computer, a tablet computer, a handheld device, a smart-phone, a thin client, a smart-watch, or any other electronic device or computing system capable of storing, compiling, and organizing audio, visual, or textual data and receiving and sending that data to and from other computing devices, such as the computing devices 104A-N, the processing server 106, the payment network nodes 110, the exchange network nodes 114, and/or loyalty network nodes 118 via one or more communication methods, such as radio frequency, local area networks, wireless area networks, cellular communication networks, Bluetooth, the Internet, etc. It can be appreciated that any number of user computing devices 102A, 102B . . . 102N can be a part of the system 100 including a single user computing device 102 or more than one user computing device 102. The user computing devices 102A-N may be exchange network nodes 114 in the exchange network 112. In an exemplary embodiment, each user device 102 is associated with a user who is member of one or more merchant loyalty programs. For example, the user computing device 102A may be a smart-phone of a user who has a loyalty membership with one or more merchants, e.g., computing device 104A. The user computing devices 102A-N may be implemented in the computer system 900 illustrated in FIG. 10 using hardware, software executed on hardware, firmware, non-transitory computer readable media having instructions stored thereon, or a combination thereof and may be implemented in one or more computer systems or other processing systems.

The computing devices 104A-N may be a desktop computer, a notebook, a laptop computer, a tablet computer, a handheld device, a smart-phone, a thin client, a smartwatch, or any other electronic device or computing system capable of storing, compiling, and organizing audio, visual, or textual data and receiving and sending that data to and from other computing devices, such as the user computing devices 102A-N, the processing server 106, the payment network nodes 110, the exchange network nodes 114, and/or loyalty network nodes 118 via one or more communication methods, such as radio frequency, local area networks, wireless area networks, cellular communication networks, Bluetooth, the Internet, etc.

It can be appreciated that any number of computing devices 104 can be a part of the system 100 including a single computing device 104 or more than one user computing device 104. In exemplary embodiments, each of the computing devices 104A-N is associated with a merchant. The computing device 104 may be, for example, a merchant point-of-sale device or a merchant server hosting a merchant website through which a user may purchase goods and/or services. Further, the computing devices 104A-N may be an exchange network node 114 in the exchange network 112. The computing device 104 may be implemented in the computer system 900 illustrated in FIG. 10 using hardware, software executed on hardware, firmware, non-transitory computer readable media having instructions stored thereon, or a combination thereof and may be implemented in one or more computer systems or other processing systems.

Figure 10:
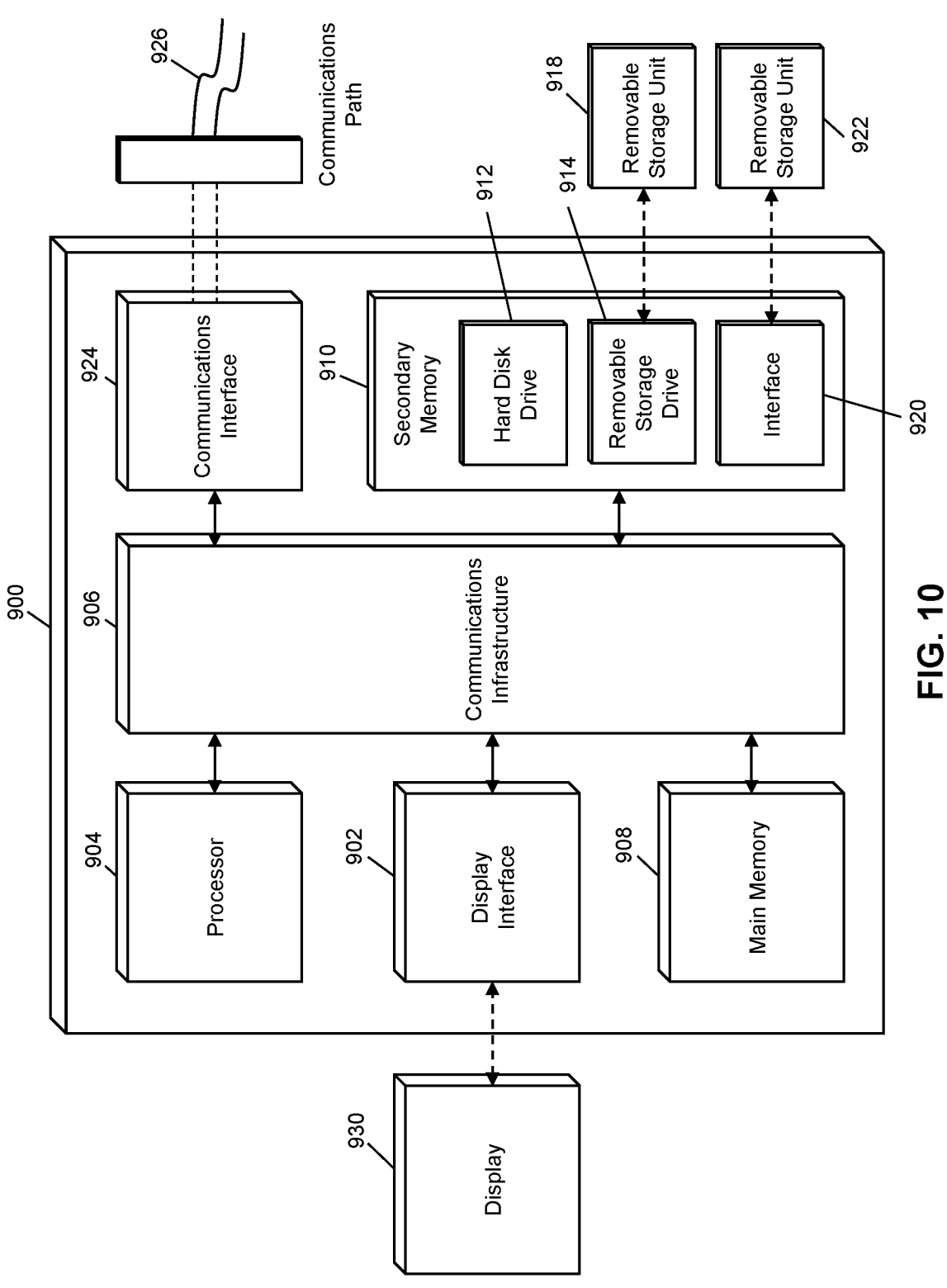
FIG. 10 is a block diagram illustrating a computer system architecture in accordance with exemplary embodiments.

Each merchant in the system 100, e.g., each computing device 104, may operate a loyalty network 116. For example, a merchant A associated with a computing device 104A may operate a loyalty network 116A and a merchant B associated with a computing device 104B may operate a loyalty network 116B. It can be appreciated that any number of loyalty networks 116 can be a part of the system 100. In exemplary embodiments, the loyalty networks 116 of different merchants are not directly interoperable. The loyalty network 116 may be comprised of a plurality of loyalty network nodes 118. Each loyalty network node 118 can be a computing system, such as illustrated in FIG. 10, discussed in more detail below, that is configured to perform functions related to the processing and management of the loyalty network 116, including the generation and management of loyalty points, the generation and management of customer accounts, the redemption of loyalty points, the valuation of loyalty points, the transfer of loyalty points, etc. The loyalty network 116 can be any suitable web 3.0 network configuration enabling communications between one or more users, e.g., the loyalty network nodes 114. For example, the loyalty network 116 can be, but is not limited to, a peer-to-peer network and/or a distributed network, etc. In some embodiments, the computing devices 104A-N and/or the user computing devices 102A-N can be loyalty network nodes

118. In an exemplary embodiment, the loyalty network 116 is a blockchain network and each of the loyalty network nodes 114 may be blockchain network nodes configured to perform functions related to the processing and management of the loyalty network 116 including the generation of blockchain data values, verification of proposed blockchain transactions, verification of digital signatures, generation of new blocks, validation of new blocks, and maintenance of a copy of the blockchain.

In embodiments, the loyalty network 116 can be a distributed ledger that is comprised of at least a plurality of blocks. Each block can include at least a block header and one or more data values. Each block header can include at least a timestamp, a block reference value, and a data reference value. The timestamp can be a time at which the block header was generated and can be represented using any suitable method (e.g., UNIX timestamp, DateTime, etc.). The block reference value can be a value that references an earlier block (e.g., based on timestamp) in the blockchain. In some embodiments, a block reference value in a block header can be a reference to the block header of the most recently added block prior to the respective block. In an exemplary embodiment, the block reference value can be a hash value generated via the hashing of the block header of the most recently added block. The data reference value can similarly be a reference to the one or more data values stored in the block that includes the block header. In an exemplary embodiment, the data reference value can be a hash value generated via the hashing of the one or more data values. For instance, the block reference value can be the root of a Merkle tree generated using the one or more data values.

The use of the block reference value and data reference value in each block header can result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single loyalty network node 118 in a loyalty network 116 prior to the generation and addition of a new block to the blockchain in order for the change to be made permanent. Computational and communication limitations can make such a modification exceedingly difficult, if not impossible, thus rendering the blockchain immutable.

In some embodiments, the loyalty network 116 can be used to store information regarding blockchain transactions conducted between two different blockchain wallets. A blockchain wallet can include a private key of a cryptographic key pair that is used to generate digital signatures that serve as authorization by a payer for a blockchain transaction, where the digital signature can be verified by the respective loyalty network 116 using the public key of the cryptographic key pair. In some cases, the term "blockchain wallet" can refer specifically to the private key. In other cases, the term "blockchain wallet" can refer to a computing device (e.g., the computing device 104 and/or the user computing devices 102A-n) that stores the private key for use thereof in blockchain transactions. For instance, each computing device can each have their own private key for respective cryptographic key pairs and can each be a blockchain wallet for use in transactions with the blockchain associated with the blockchain network. Computing devices can be any type of device suitable to store and utilize a blockchain wallet, such as a desktop computer, laptop computer, notebook computer, tablet computer, cellular phone, smart phone, smart watch, smart television, wearable computing device, implantable computing device, etc.

Each blockchain data value stored in the loyalty network 116 can correspond to a blockchain transaction or other storage of data, as applicable, such as loyalty points. A blockchain transaction can consist of at least: a digital signature of the sender of that is generated using the sender's private key, a blockchain address of the recipient of loyalty points generated using the recipient's public key, and a loyalty point amount that is transferred or other data being stored. In some blockchain transactions, the transaction can also include one or more blockchain addresses of the sender where loyalty points are currently stored (e.g., where the digital signature proves their access to such loyalty points), as well as an address generated using the sender's public key for any change that is to be retained by the sender. Addresses to which loyalty points, currency, or any other suitable data has been sent that can be used in future transactions are referred to as "output" addresses, as each address was previously used to capture output of a prior blockchain transaction, also referred to as "unspent transactions," due to there being loyalty points sent to the address in a prior transaction where those loyalty points are still unspent, e.g., not redeemed. In some cases, a blockchain transaction can also include the sender's public key, for use by an entity in validating the transaction. In exemplary embodiments, transactions in the loyalty network 116 are the creation, storage, transfer, and redemption of loyalty points and thus the data associated with each blockchain transaction in the loyalty network 116 relates to loyalty points. For the traditional processing of a blockchain transaction, such data can be provided to a loyalty network node 118 in the loyalty network 116, either by the sender or the recipient, e.g., the user computing devices 102A-N and/or the computing devices 104A-N. The node can verify the digital signature using the public key in the cryptographic key pair of the sender's wallet and also verify the sender's access to the funds (e.g., that the unspent transactions have not yet been spent and were sent to address associated with the sender's wallet), a process known as "confirmation" of a transaction, and then include the blockchain transaction in a new block. The new block can be validated by other loyalty network nodes 118 in the loyalty network 116 before being added to the blockchain and distributed to all of the loyalty network nodes 118 in the loyalty network 116, respectively, in traditional blockchain implementations. In cases where a blockchain data value cannot be related to a blockchain transaction, but instead the storage of other types of data, blockchain data values can still include or otherwise involve the validation of a digital signature.

The processing server 106 may be a desktop computer, a notebook, a laptop computer, a tablet computer, a handheld device, a smart-phone, a thin client, a smartwatch, or any other electronic device or computing system capable of storing, compiling, and organizing audio, visual, or textual data and receiving and sending that data to and from other computing devices, such as the user computing devices 102A-N, the computing devices 104A-N, the payment network nodes 110, the exchange network nodes 114, and/or the loyalty network nodes 118 via one or more communication methods, such as radio frequency, local area networks, wireless area networks, cellular communication networks, Bluetooth, the Internet, etc. In some cases, the processing server 106 may be a payment network node in the payment network 110 and/or an exchange network node 114 in the exchange network 112. It can be appreciated that any number of processing servers 106 can be a part of the system

100 including a single processing server 106 or more than one processing server 106. The processing server 106 may be implemented in the computer system 900 illustrated in FIG. 10 using hardware, software executed on hardware, firmware, non-transitory computer readable media having instructions stored thereon, or a combination thereof and may be implemented in one or more computer systems or other processing systems.

The payment network 108 may be a system or network used for the transfer of money via the use of cash-substitutes for thousands, millions, and even billions of transactions during a given period. Payment networks may use a variety of different protocols and procedures in order to process the transfer of money for various types of transactions. Transactions that may be performed via a payment network may include product or service purchases, credit purchases, debit transactions, fund transfers, account withdrawals, etc. The payment network 108 may be configured to perform transactions via cash-substitutes, which may include payment cards, letters of credit, checks, transaction accounts, etc. Examples of networks or systems configured to perform as the payment network 108 include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network. For example, the payment network 108 may include payment rails which is the infrastructure associated with the payment network 108 used in the processing of payment transactions and the communication of transaction messages and other similar data between the payment network and other entities interconnected with the payment network that handles thousands, millions, and even billions of transactions during a given period. The payment rails may be comprised of the hardware used to establish the payment network 108 and the interconnections between the payment network and other associated entities, such as financial institutions, gateway processors, etc. In some instances, payment rails may also be affected by software, such as via special programming of the communication hardware and devices that comprise the payment rails. For example, the payment rails may include one or more payment network nodes specifically configured for the routing of transaction messages, which may be specially formatted data messages that are electronically transmitted via the payment rails, as discussed in more detail below.

The exchange network 112 is a marketplace that enables users, e.g., the exchange network nodes 114, to list and transact loyalty points from one or more merchant loyalty programs. The exchange network 112 may be any suitable network configuration enabling communications between one or more users, e.g., the exchange network nodes 114. For example, the exchange network 112 can be, but is not limited to, a peer-to-peer exchange and/or a decentralized exchange, etc. The exchange network 112 may be comprised of a plurality of exchange network nodes 114. Each exchange network node 114 can be a computing system, such as illustrated in FIG. 10, discussed in more detail below, that is configured to perform functions related to the processing and management of the exchange network 112, including the generation and storage of user loyalty profiles 208, generation and storage of merchant profiles 209, maintenance of a loyalty point liquidity pool, generating and storing smart contracts, generation of loyalty point exchange transactions, verification of proposed loyalty point exchange transactions, verification of digital signatures, generation of new blocks, validation of new blocks, and maintenance of the exchange. In exemplary embodiments, the user computing devices 102A-N, the computing devices 104A-N, and the processing server 106 can be an exchange network nodes 114.

In an exemplary embodiment the exchange network 112 can be a blockchain network. The exchange network 112 can be comprised of a plurality of blockchain nodes, e.g., the exchange network nodes 114. Each blockchain node can be a computing system, such as illustrated in FIG. 10, discussed in more detail below, that is configured to perform functions related to the processing and management of the blockchain, including the generation of blockchain data values, verification of proposed blockchain transactions, verification of digital signatures, generation of new blocks, validation of new blocks, and maintenance of a copy of the blockchain. In some embodiments, the user computing devices 102A-N, the computing devices 104A-N, and/or the processing server 106 can be a blockchain node in the exchange network 112.

The blockchain can be a distributed ledger that is comprised of at least a plurality of blocks. Each block can include at least a block header and one or more data values. Each block header can include at least a timestamp, a block reference value, and a data reference value. The timestamp can be a time at which the block header was generated and can be represented using any suitable method (e.g., UNIX timestamp, DateTime, etc.). The block reference value can be a value that references an earlier block (e.g., based on timestamp) in the blockchain. In some embodiments, a block reference value in a block header can be a reference to the block header of the most recently added block prior to the respective block. In an exemplary embodiment, the block reference value can be a hash value generated via the hashing of the block header of the most recently added block. The data reference value can similarly be a reference to the one or more data values stored in the block that includes the block header. In an exemplary embodiment, the data reference value can be a hash value generated via the hashing of the one or more data values. For instance, the block reference value can be the root of a Merkle tree generated using the one or more data values.

The use of the block reference value and data reference value in each block header can result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single blockchain node, e.g., exchange network nodes 114, in the blockchain network, e.g., the exchange network 112, prior to the generation and addition of a new block to the blockchain in order for the change to be made permanent. Computational and communication limitations can make such a modification exceedingly difficult, if not impossible, thus rendering the blockchain immutable.

In some embodiments, the blockchain can be used to store information regarding blockchain transactions e.g., loyalty point exchanges/purchases, conducted between two different blockchain wallets, e.g., wallets belonging to a user computing device 102 and a computing device 104. A blockchain wallet can include a private key of a cryptographic key pair that is used to generate digital signatures that serve as authorization by a payer for a blockchain transaction, where the digital signature can be verified by the blockchain network, e.g., the exchange network 112, using the public key of the cryptographic key pair. In some cases, the term "blockchain wallet" can refer specifically to the private key. In other cases, the term "blockchain wallet" can refer to a computing device (e.g., user computing devices 102A-N, computing device 104A-N, and/or exchange network nodes 114, etc.) that stores the private key for use thereof in blockchain transactions. For instance, each computing device, e.g., each exchange network node 114, can each have their own private key for respective cryptographic key pairs and can each be a blockchain wallet for use in transactions with the blockchain associated with the blockchain network. Computing devices can be any type of device suitable to store and utilize a blockchain wallet, such as a desktop computer, laptop computer, notebook computer, tablet computer, cellular phone, smart phone, smart watch, smart television, wearable computing device, implantable computing device, etc.

Each blockchain data value stored in the blockchain can correspond to a blockchain transaction or other storage of data, as applicable, such as loyalty points. A blockchain transaction can consist of at least: a digital signature of the sender of data and/or currency (e.g., a user computing device 102) that is generated using the sender's private key, a blockchain address of the recipient of loyalty points (e.g., another user computing device 102) generated using the recipient's public key, and a loyalty point amount that is transferred, or other data being stored. In some blockchain transactions, the transaction can also include one or more blockchain addresses of the sender where loyalty points are currently stored (e.g., where the digital signature proves their access to such loyalty points such as the loyalty network 116), as well as an address generated using the sender's public key for any change that is to be retained by the sender. Addresses to which loyalty points have been sent that can be used in future transactions are referred to as "output" addresses, as each address was previously used to capture output of a prior blockchain transaction, also referred to as "unspent transactions," due to there being loyalty points sent to the address in a prior transaction where that currency is still unspent, e.g., not redeemed. In some cases, a blockchain transaction can also include the sender's public key, for use by an entity in validating the transaction. For the traditional processing of a blockchain transaction, such data can be provided to a blockchain node, e.g., an exchange network node 114, in the blockchain network, e.g., the exchange network 112, either by the sender or the recipient. The blockchain node can verify the digital signature using the public key in the cryptographic key pair of the sender's wallet and also verify the sender's access to the funds (e.g., that the unspent transactions have not yet been spent and were sent to address associated with the sender's wallet), a process known as "confirmation" of a transaction, and then include the blockchain transaction in a new block. The new block can be validated by other blockchain nodes, e.g., exchange network nodes 114, in the blockchain network, e.g., the exchange network 112, before being added to the blockchain and distributed to all of the blockchain nodes in the blockchain network, respectively, in traditional blockchain implementations. In cases where a blockchain data value cannot be related to a blockchain transaction, but instead the storage of other types of data, blockchain data values can still include or otherwise involve the validation of a digital signature.

In the system 100, the user computing devices 102A-N, the computing devices 104A-N, the processing server 106, and/or the exchange network nodes 114 can create a new blockchain wallet for use with the blockchain. The blockchain wallet can be used by the user computing devices 102A-N, the computing devices 104A-N, the processing server 106, and/or the exchange network nodes 114 to receive or transfer loyalty points, cryptographic currency, and/or other value that is transferred or otherwise has ownership maintained via the exchange network 112. In the system 100, the user of the user computing devices 102A-N, the computing devices 104A-N, the processing server 106, and/or the exchange network nodes 114 that own and/or operate the wallet, or any transactions involving the user, such as those conducted using the new blockchain wallet, may want transact and/or exchange loyalty points they own from one or more merchant loyalty programs, e.g., the loyalty network 116.

In embodiments, the exchange network 112 is a loyalty point exchange that facilitates loyalty point exchanges between a plurality of loyalty networks 116 where each of the loyalty networks 116 are blockchain networks. For example, the loyalty points associated with each loyalty network 116 remain on the associated loyalty network 116 and the exchange network 112 enables users, e.g., exchange network nodes 114, to exchange loyalty points between the different loyalty networks 116. In this way, the exchange network 112 functions as a cross-chain network. Cross-chain networks are described more fully in U.S. Pat. No. 11,689, 355 issued on Jun. 27, 2023, entitled "METHOD AND SYSTEM FOR THE ATOMIC EXCHANGE OF BLOCK-CHAIN ASSETS USING TRANSIENT KEY PAIRS," the contents of which are incorporated herein by reference in their entirety.

Figure 3:
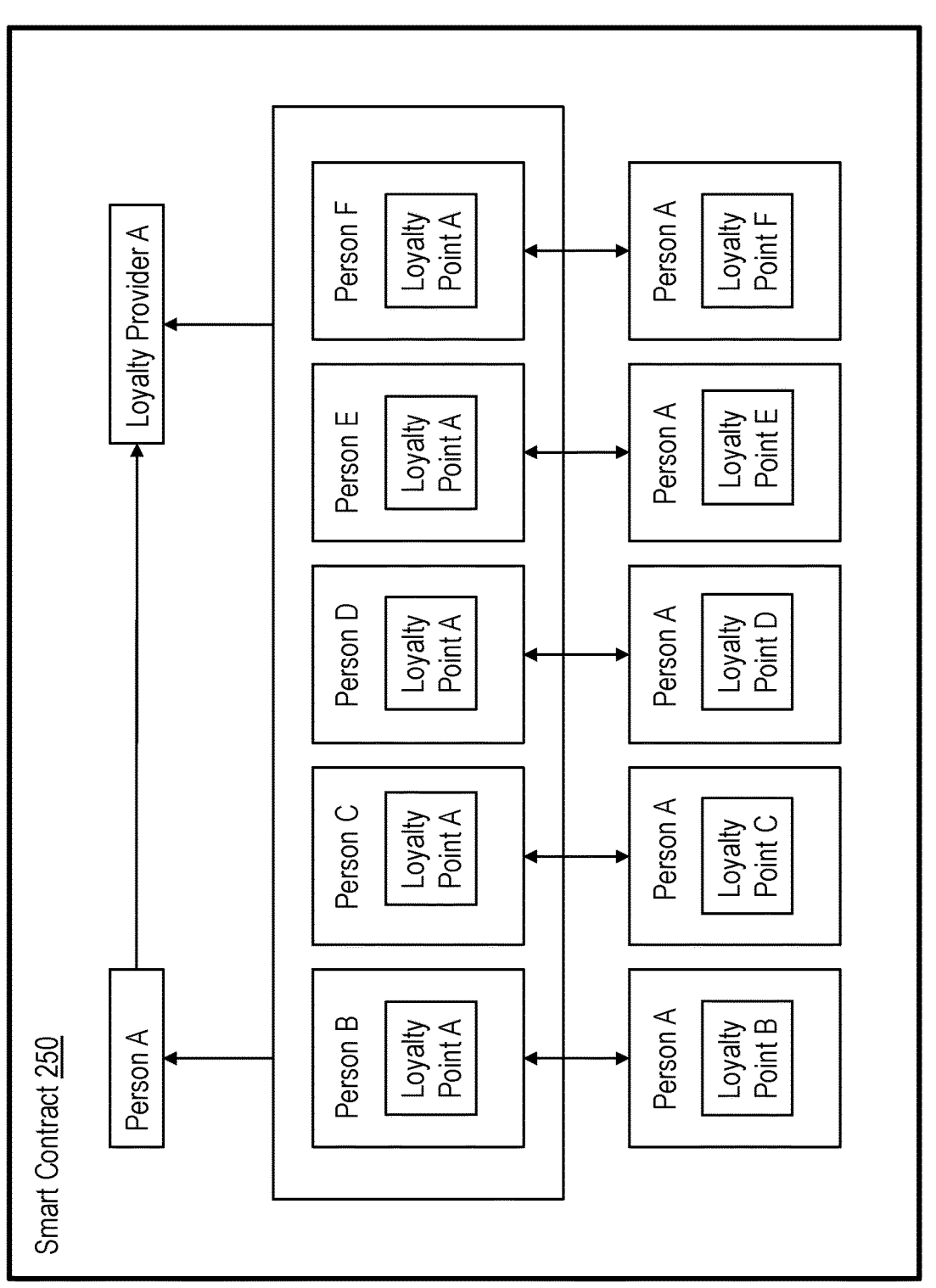
FIG. 3 is a block diagram illustrating a smart contract in the system of FIG. 1 for exchanging loyalty points in accordance with exemplary embodiments.
Figure 4A:
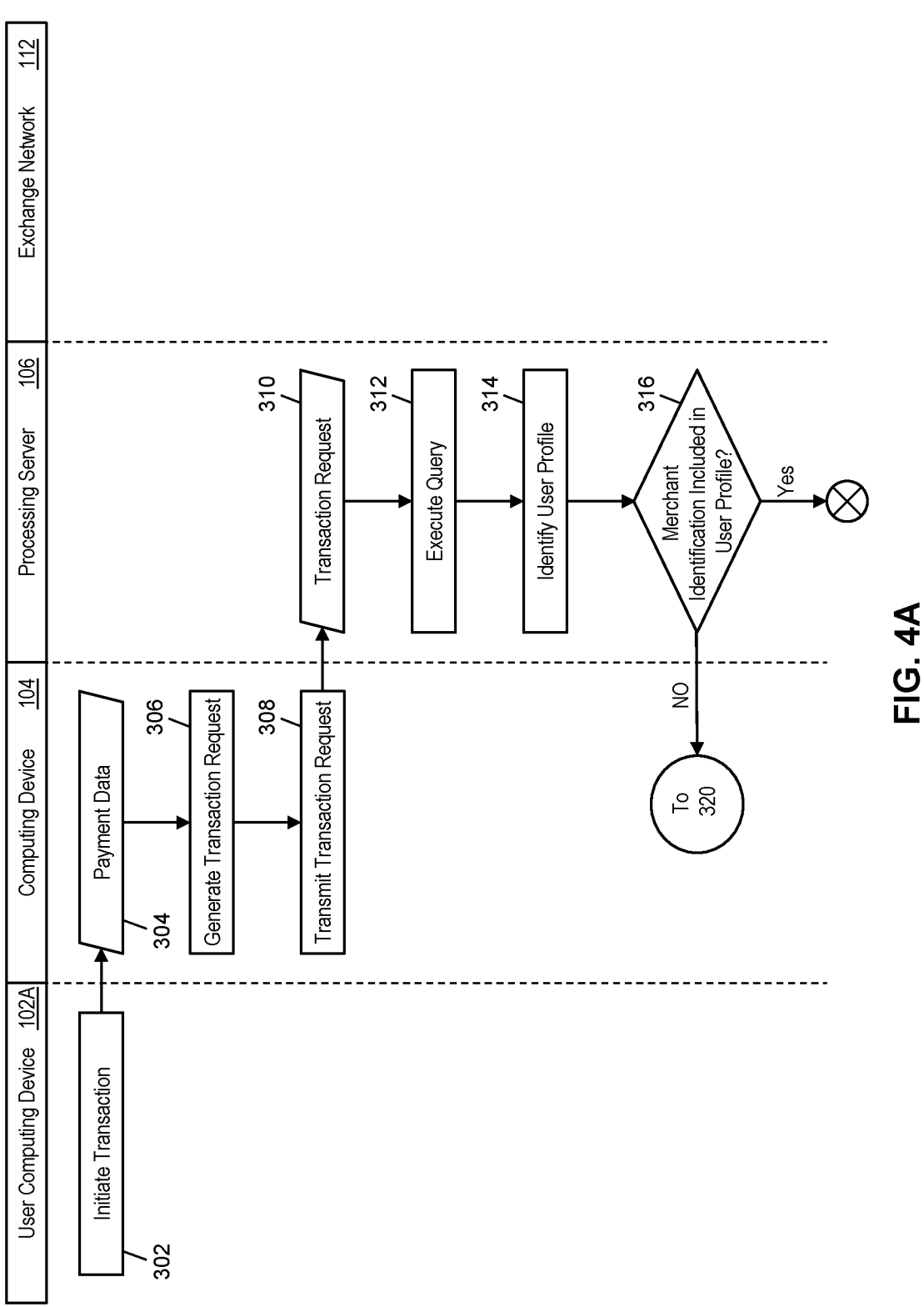
FIGS. 4A-4D are a flow diagrams illustrating a process for exchanging loyalty points in the system of FIG. 1 in accordance with exemplary embodiments.
Figure 4B:
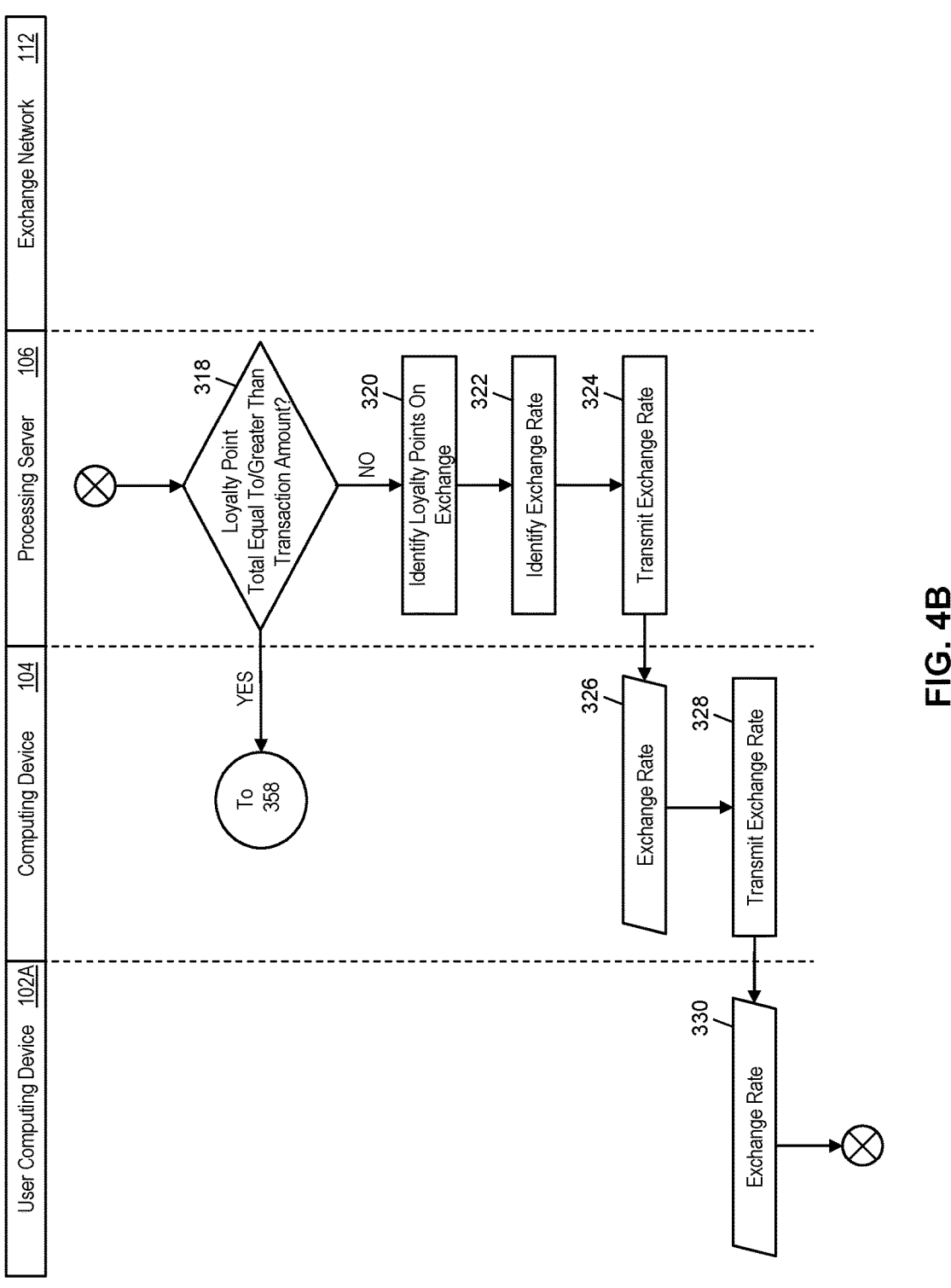
Figure 4C:
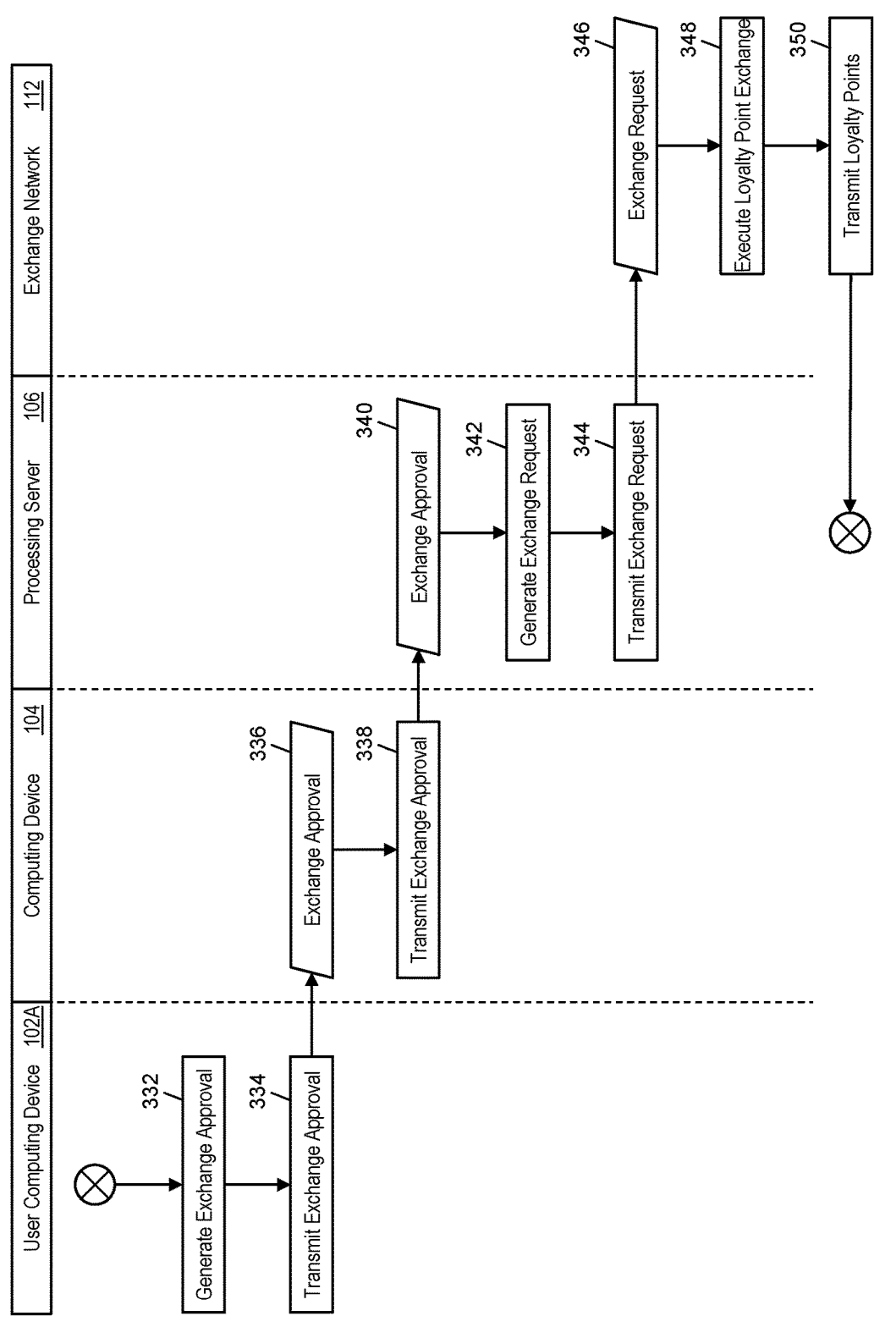
Figure 4D:
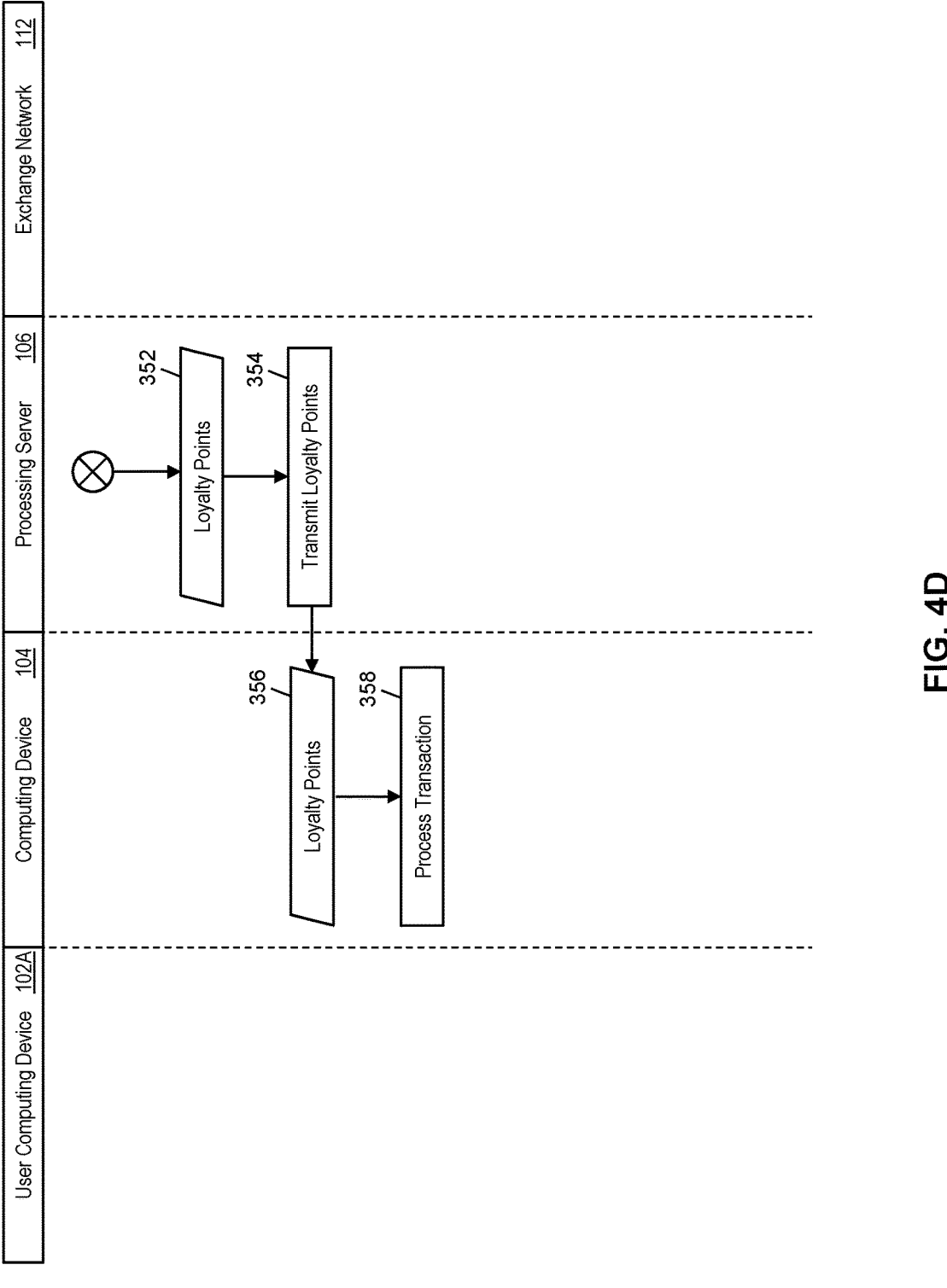

In order to list loyalty points on the exchange network 112, a user, e.g., a user computing device 102, may register with the exchange network 112. In embodiments, registration of the user, e.g., the user computing device 102, with the exchange network 112 includes the user computing device 102 granting permission to the exchange network 112 to tokenize loyalty points associated with the user, e.g., the user computing device 102. The user, e.g., via the user computing device 102, may register with the exchange network 112 by accessing an interface of the exchange network 112, e.g., a website, an application, a server, or any other suitable portal for accessing a network platform. The user computing device 102 may communicate with the exchange network 112 directly, e.g., as an exchange network node 114, or via a third-party, e.g., the processing server 106. The user computing device 102 may generate a registration request message and transmit the registration request message to the exchange network 112. Registration of the user, e.g., the user computing device 102, with the exchange network 112 may include creating a user loyalty profile 208. The user loyalty profile 208 may include, but is not limited to, a user identifier identifying a user and one or more merchant identifiers identifying one or more merchants, each of the one or more merchant identifiers associated with a loyalty point total. The loyalty point total being a number of loyalty points the user of the user loyalty profile 208 has with the associated merchant. In embodiments, the user loyalty profile 208 may include loyalty point tokens where each loyalty point owned by the user is represented as a digital token. In embodiments, the exchange network 112 may not store loyalty points directly and the user loyalty profile may include a loyalty network 116 identification and user credentials for accessing the loyalty network 116. The exchange network 112 may store the user loyalty profile 208 in a database, e.g., the profile database 206. In embodiments, the user loyalty profile 208 may include one or more smart contracts. For example, the user loyalty profile 208 may include one or more user-generated smart contracts for controlling the sale and/or exchange of the user's loyalty points. The user loyalty profile 208 may include a user-generated contract that controls the sale and/or exchange of all the user's loyalty points, e.g., loyalty points associated with a plurality of different merchants, and/or the user loyalty profile 208 may include a single user-generated smart contract that controls the sale and/or exchange of all the user's loyalty points including those associated with a plurality of different merchants. The one or more user-generated smart contracts may include one or more conditions for the sale and/or exchange of loyalty points associated with each merchant. For example, the one or more conditions may include an exchange on/off condition that defines a threshold number of loyalty points of each merchant that can be exchanged in a defined period of time, a minimum exchange rate that defines a minimum currency and/or minimum other merchant loyalty point amount that may be exchanged for each merchant loyalty point, a maximum exchange rate that defines a maximum currency and/or maximum other merchant loyalty point amount that may be exchanged for each merchant loyalty point, an algorithm that adjusts the exchange rate for each merchant loyalty point based supply/demand metrics, e.g., how many merchant loyalty points are sold, exchanged, and/or available for exchange via the exchange network 112 and/or how many merchant loyalty points are created and/or redeemed via the loyalty network 116, etc. As another example, the user loyalty profile 208 may include one or more merchant-generated smart contracts that control the sale and/or exchange of loyalty points associated with that merchant, e.g., the computing device 104. The merchant-generated smart contract may include one or more conditions for the sale and/or exchange of loyalty points of the associated merchant. The one or more conditions of each merchant-generated smart contract may include an exchange on/off condition that defines a threshold number of loyalty points of the associated merchant that can be exchanged in a defined period of time, a minimum exchange rate that defines a minimum currency and/or minimum other merchant loyalty point amount that may be exchanged for each merchant loyalty point, a maximum exchange rate that defines a maximum currency and/or maximum other merchant loyalty point amount that may be exchanged for each merchant loyalty point, an algorithm that adjusts the exchange rate based supply/demand metrics, e.g., how many merchant loyalty points are sold, exchanged, and/or available for exchange via the exchange network 112 and/or how many merchant loyalty points are created and/or redeemed via the loyalty network 116, etc. Referring to FIG. 3, an example smart contract 250 is illustrated. The smart contract 250 controls the exchange of loyalty points B-F of Person A, each for a loyalty point A from Persons B-F. For example, Person A, e.g., the user computing device 102A, may need five loyalty points associated with merchant A and is willing to exchange a loyalty point associated with merchants B-F with Persons B-F, each for a loyalty point A from Persons B-F. Thus, Person A will give Persons B-F a loyalty point B-F, respectively, and in return Persons B-F will each give Person A a loyalty point A. The smart contract 25 may include an exchange rate for loyalty point A with each of the loyalty points B-F, which may be the same exchange rate or a different exchange rate. Further, each exchange rate may be based on one or more conditions as described above. While FIG. 3 illustrates the exchange of a loyalty points from each of a plurality of different merchants for loyalty points of a single merchant from a corresponding number of different persons, it can be appreciated that any number of points from any number of merchants can be exchanged between any number of persons. Further, the smart contract 250 may define where the loyalty points are transferred to. For example, instead of sending the loyalty points A from Persons B-F directly to Person A, the smart contract may dictate that the loyalty points be transferred to the merchant A directly, e.g., the computing device 104 and/or the loyalty network 116. The exchange network 112, e.g., via an exchange network node 114, may respond to the user registration, e.g., the registration request message and/or the user loyalty profile 208 creation, by generating a verification message and transmitting the verification message to the user computing device 102. The verification message may be an approval message and/or a request to verify the computing device 102 associated with the user. Any suitable verification method may be used such as transmitting a one-time code to the user computing device 102 for entry into a notification or prompt from the exchange network 112, a verification link sent to an email address associated with the user computing device 102, etc. Once the user computing device 102 is registered with the exchange network 112, the user computing device 102 may become an exchange network node 114. Further, as a function of registration, any loyalty points included in the user loyalty profile 208 may be listed for sale and/or exchange on the exchange network 112.

Similar to the user computing device 102, a merchant, e.g., via the computing device 104, may register with the exchange network 112 to enable loyalty points associated with the merchant's loyalty program, e.g., the loyalty network 116, to be listed and exchanged on the exchange network 112. In embodiments, registration of the merchant, e.g., the computing device 104, with the exchange network 112 includes the computing device 104 granting permission to the exchange network 112 to tokenize loyalty points associated with the merchant's loyalty program, e.g., the loyalty network 116. For example, the exchange network 112 may represent each loyalty point in the loyalty network 116 as a digital token. The merchant, e.g., via the computing device 104, may register with the exchange network 112 by accessing an interface of the exchange network 112, e.g., a website, an application, a server, or any other suitable portal user for accessing a network platform. The computing device 104 may communicate with the exchange network 112 directly, e.g., as an exchange network node 114, or via a third-party, e.g., the processing server 106. The computing device 104 may generate a registration request message and transmit the registration request message to the exchange network 112. Registration of the merchant, e.g., the computing device 104, with the exchange network 112 may include creating a merchant profile 209. The merchant profile 209 may include, but is not limited to, a merchant identification identifying the merchant, e.g., the computing device 104, a loyalty program identification identifying a loyalty program, e.g., the loyalty network 116, and one or more merchant-generated smart contracts as discussed above. The exchange network 112 may store the merchant profile 209 in a database, e.g., the profile database 206. The exchange network 112, e.g., via an exchange network node 114, may respond to the user registration, e.g., the registration request message and/or the user loyalty profile creation, by generating a verification message and transmitting the verification message to the computing device 104. The verification message may be an approval message and/or a request to verify the computing device 102 associated with the user. Any suitable verification method may be used such as transmitting a one-time code to the computing device 104 for entry into a notification or prompt from the exchange network 112, a verification link sent to an email address associated with the user computing device 102, etc. Once the computing device 104 is registered with the exchange network 112, the computing device 104 may become an exchange network node 114.

In embodiments, user and/or merchants may onboard another user and/or merchant to the exchange network 112. For example, a user and/or merchant who is already a member of the exchange network 112, e.g., an exchange network node 114, may invite another user and/or merchant, e.g., the user computing device 102B and/or the computing device 104B, to join the exchange network 112. In embodiments, a first merchant A, e.g., the computing device 104A, may generate an onboarding request for a second merchant B, e.g., the computing device 104B, and transmit the onboarding request to the exchange network 112, e.g., via an exchange network node 114. The onboarding request may include one or more of a second merchant identification, e.g., a second merchant name, a second merchant identification number, and a second merchant address, e.g., an electronic messaging address, etc., associated with the second merchant, e.g., the computing device 104B. Upon receipt of the onboarding request, the exchange network 112 may transmit, e.g., via an exchange network node 114, a notification to the second merchant B, e.g., the computing device 104B. The second merchant B, e.g., the computing device 104B, may proceed to register with the exchange network 112 as described above with reference to the computing device 104. Once the second merchant B, e.g., the computing device 104B, has successfully registered with the exchange network 112, the exchange network 112 may generate and transmit, e.g., via an exchange network node 114, a notification the first merchant A, e.g., the computing device 104A, notifying the first merchant A that merchant B has successfully onboarded to the exchange network 112. While the above example uses the onboarding of second merchant, e.g., computing device 104B, to the exchange network 112, it can be appreciated that the same process can be used to onboard a second user, e.g., computing device 102B, to the exchange network 112.

In an embodiment, a first user in the exchange network 112, e.g., the user computing device 102A, initiates a transaction for goods and/or services with a first merchant point-of-sale device and/or website, e.g., the computing device 104A. The user computing device 102A may transmit transaction data, e.g., a transaction account number, a transaction amount, etc., to the computing device 104A, e.g., a point-of-sale device. For example, the user of the user computing device 102A may tap or scan a payment card stored on the user computing device 102A at a card reader associated with the computing device 104A or the user associated with the user computing device 102A may simply swipe, tap, or enter a physical payment card into a card reader associated with the computing device 104, or the user may enter payment information via a website or application associated with the computing device 104A. In an exemplary embodiment, the first user, e.g., the user computing device 102A, indicates full or partial payment of the transaction with loyalty points associated with the merchant, e.g., loyalty points stored in the loyalty network 116, and such indication is included in the transaction data. The computing device 104A may receive the transaction data from the user computing device 102A. The computing device 104A generates a transaction request in response to the indication of full or partial payment of the transaction with loyalty points. The computing device 104A may transmit the transaction request to a payment network, e.g., the payment network 108, via the processing server 106 for authentication. The processing server 106 may receive the transaction request and generate a user profile request for a user loyalty profile 208 associated with the user computing device 102A. For example, the processing server 106 may generate the request for a user loyalty profile 208 associated with the user computing device 102A based on the indication of payment with loyalty points in the transaction data. In embodiments where the processing server 106 is an exchange network node 114 in the exchange network 112, the processing server may execute a query on the profile database 206 to identify the user loyalty profile 208 associated with the user computing device 102A. In embodiments where the processing server 106 is not an exchange network node 114, the processing server 106 transmits the user profile request to an exchange network node 114 in the exchange network 112. The exchange network node 114 then executes a query on the database 206 to identify the user loyalty profile 208 associated with the user computing device 102A. The processing server 106 and/or the exchange network node 114 may identify the user loyalty profile 208 based on a user identification included in the transaction request. Once the user loyalty profile 208 associated with the user computing device 102A is identified, the processing server determines if the user has loyalty points associated with the merchant, e.g., the computing device 104A. If the user loyalty profile 208 does have loyalty points associated with the merchant, e.g., the computing device 104A, the processing server 106 determines if the user has enough loyalty points to cover the transaction amount. If the user loyalty profile 208 does not have enough loyalty points to cover the transaction amount or the user does not have any loyalty points with the merchant, the processing server 106 may initiate a loyalty point exchange on the exchange network 112.

As part of the loyalty point exchange on the exchange network 112, the processing server 106 may identify another member of the exchange network 112 having enough loyalty points associated with the merchant, e.g., the computing device 104A, to cover the transaction amount and/or the part of the transaction amount not covered by the first user's loyalty points. For example, the first user, e.g., the user computing device 102A, may only have enough loyalty points in the user loyalty profile 208 to cover a portion of the transaction amount and the processing server 106 may identify one or more second users or combination of second users on the exchange network 112 that have enough loyalty points listed to cover the remainder of the transaction amount. The processing server 106 may identify an exchange rate associated with the loyalty points listed by the one or more second users. For example, the user loyalty profile 208 associated with each of the one or more second users may include an exchange rate associated with the associated user's loyalty points. In an embodiment, the exchange rate may be an exchange rate for one or more other loyalty points. For example, the first user, e.g., the user computing device 102A, may have one or more loyalty points associated with a different merchant other than the merchant identified in the transaction data, e.g., the computing device 104A, and the exchange rate may be an amount of other loyalty points, e.g., associated with a second merchant, that are worth each loyalty point associated with the first merchant, e.g., the computing device 104A. In an embodiment, the exchange rate may be a currency amount for each loyalty point associated with the first merchant, e.g., the computing device 104A. In embodiments, the user loyalty profile 208 associated with each of the one or more second users may include one or more user-generated smart contracts and/or merchant-generated smart contracts as discussed in more detail above. Once the processing server 106 has identified the one or more second users and an associated exchange rate, the processing server 106 may transmit the exchange rate(s) to the computing device 104A. The computing device 104A may receive the exchange rate from the processing server 106 and transmit the exchange rate to the user computing device 102A. For example, the computing device 104A may transmit the exchange rate to the user computing device 102A for approval and/or denial. In embodiments, the processing server 106 may transmit a plurality of exchange rates and the computing device 104A may present the plurality of exchange rates, e.g., via a display on the computing device 104A, to the user computing device 102A for selection. The user, via the user computing device 102A, generates a response message to the exchange rate. For example, the user, via the user computing device 102A, may approve the exchange rate transmitted by the computing device 104A and/or may select one of the plurality exchange rates transmitted by the computing device 104A. The user computing device 102A may transmit the response message to the computing device 104A and the computing device 104A may receive the response message and transmit the response message to the processing server 106. The processing server 106 generates an exchange request based on the user's approval and/or exchange rate selection. The exchange request may include a loyalty point amount, e.g., an amount of loyalty points associated with the merchant to cover the transaction amount, a user identifier of the identified user loyalty profile, and the merchant identifier that matches the merchant identification included in the transaction request. The processing server 106 transmits the exchange request to the exchange network 112. In embodiments, the exchange network may transmit the exchange request to the identified one or more second users for approval. The exchange network 112 executes the loyalty point exchange. In embodiments where the exchange network 112 is a blockchain network, an exchange network node 114 may generate a blockchain transaction including at least the identification of the first user, the identification of the second user, the identification of the first merchant, a first loyalty point amount equal to the loyalty point total required to cover the transaction amount, a second loyalty amount equal to a difference between the loyalty points associated with the merchant identifier stored in the identified user loyalty profile and the loyalty point total required to cover the transaction amount, and a transaction amount. The exchange network 112 transmits the loyalty points of the one or more second users to the processing server 106 and the loyalty points being exchanged from the first user, e.g., the user computing device 102A, and/or the currency amount to the one or more second users, e.g., the user computing devices 102B-N. In embodiments where the loyalty points are tokenized, the exchange network 112 may transmit the digital tokens representing the loyalty points of the one or more second users to the processing server 106 and the loyalty points being exchanged from the first user, e.g., the user computing device 102A, and/or the currency amount to the one or more second users, e.g., the user computing devices 102B-N. The processing server 106 receives the loyalty points and/or the digital tokens representing the loyalty points of the one or more second users and transmits the loyalty points and/or the digital tokens representing the loyalty points of the one or more second users to the computing device 104A. The computing device 104A receives the loyalty points and/or the digital tokens representing the loyalty points of the one or more second users and processes the transaction. For example, the computing device 104A may redeem the loyalty points to satisfy the transaction, e.g., via the loyalty network 116 associated with the first merchant, e.g., the computing device 104A. While the processing server 106 as discussed above it described as third-party to the exchange network 112, it can be appreciated that the processing server 106 may be a part of the exchange network itself, e.g., the processing server 106 may be an exchange network node 114.

In embodiments, users of the exchange network 112, e.g., exchange network nodes 114, may wish to exchange and/or purchase loyalty points directly from other users, e.g., other e.g., exchange network nodes 114. In such embodiments, the exchange network 112 functions as a peer-to-peer exchange network. One or more users, e.g., user computing devices 102 and/or exchange network nodes 114, may register with the exchange network 112 as described above. Once the one or more users are registered with the exchange network, the one or more users may list their loyalty points on the exchange network 112. In an embodiment, the user computing device 102A generates a loyalty point transaction request. For example, the user computing device 102A may wish to purchase loyalty points of the user computing device 102B listed on the exchange network 112. The loyalty point transaction request may include a user identification, e.g., an identification of a user on the exchange network 112 and/or a loyalty point exchange node 114 on the exchange network 112, and a first loyalty request point amount of first loyalty points, e.g., loyalty points associated with a first loyalty point program of a merchant, e.g., the loyalty network 116. The first loyalty point request amount may be associated with a first merchant identifier, e.g., an identifier of a particular merchant and/or loyalty point program, e.g., the loyalty network 116. For example, a user associated with the user computing device 102A identifies one or more loyalty points associated with a loyalty program, e.g., merchant A, on the loyalty point exchange 112 that the user would like to purchase for a currency amount and/or exchange with loyalty points associated with a different loyalty point program, e.g., merchant B. The user computing device 102A transmits the loyalty point transaction request to the exchange network 112, e.g., the processing server 106 and/or an exchange network node 114. The processing server 106 and/or an exchange network node 114 receives the loyalty point transaction request from the user computing device 102A and executes a query on the exchange network 112, e.g., the database 206 and/or the database 210, to identify a user loyalty profile 208 corresponding to the user computing device 102B. The processing server 106 and/or an exchange network node 114 identifies a user loyalty profile 208 including the user identification included in the loyalty point transaction request. The identified user loyalty profile 208 may include at least one merchant identifier matching the first merchant identifier. The merchant identifier may be associated with a loyalty point total and a loyalty point exchange rate. In an embodiment, the exchange rate may be a currency value of each first loyalty point and the transaction total may be a currency amount equal to the first loyalty point request amount based on the exchange rate. In an embodiment, the exchange rate may be a value of second loyalty points associated with a second merchant identifier equal to each first loyalty point associated with the first merchant identifier and the transaction total may be a second loyalty point amount equal to the first loyalty point request amount based on the exchange rate. The exchange rate may be set by a merchant associated with the merchant identifier and/or the exchange rate may be set by a user associated with the identified user loyalty profile 208, e.g., the user computing device 102B. The processing server 106 and/or an exchange network node 114 determines a transaction total based on the first loyalty request point amount in the loyalty point transaction request and the exchange rate included in the identified user loyalty profile 208, e.g., of the user computing device 102B. The processing server 106 and/or an exchange network node 114 executes the loyalty point transaction. In embodiments, prior to executing the loyalty point transaction, the processing server 106 and/or an exchange network node 114 may generate and transmit an approval message to the user computing device 102A and the processing server 106 and/or an exchange network node 114 may receive a response message from the user computing device 102A approving or denying the loyalty point transaction. In executing the loyalty point transaction, the processing server 106 and/or an exchange network node 114 transmits loyalty points equal to the first loyalty point request amount to the user computing device 102A and the corresponding transaction amount, e.g., a currency amount and/or the second loyalty point amount, to the user computing device 102B.

It can be appreciated that in any embodiments disclosed herein, the loyalty network 112 may be a blockchain network and, all communications, or any combination of communications, as described above between the exchange network 112, the user computing devices 102A-N, the computing devices 104A-N, and the loyalty network 116 can be blockchain transactions that are verified and added to the blockchain network, e.g., the loyalty network 112.

The methods and systems discussed herein provide for the listing, sale, and exchange of loyalty points from a plurality of different loyalty programs among and between users via a central exchange platform, e.g., the exchange network 112. As a result, the exchange network 112 increases engagement between merchants and consumers by enabling the interoperability of merchant loyalty programs.

Processing Server

Figure 2:
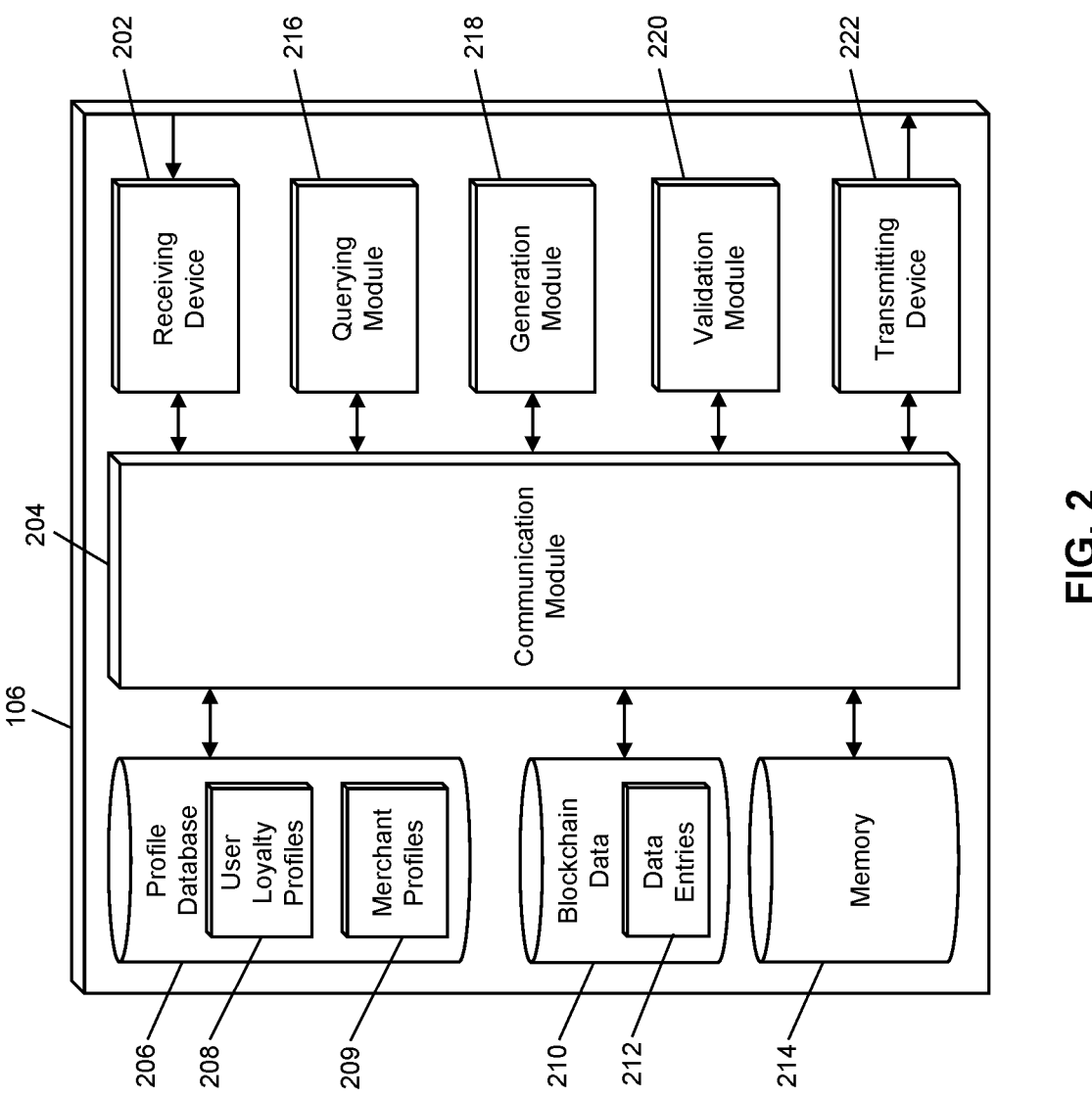
FIG. 2 is a block diagram illustrating the processing server in the system of FIG. 1 for exchanging loyalty points in accordance with exemplary embodiments.

FIG. 2 illustrates an embodiment of the processing server 106 in the system 100 of FIG. 1. It will be apparent to persons having skill in the relevant art that the embodiment of the processing server 106 illustrated in FIG. 2 is provided as illustration only and is not exhaustive of all possible configurations of the processing server 106 suitable for performing the functions as discussed herein. For example, the computer system 900 illustrated in FIG. 10 and discussed in more detail below can be a suitable configuration of the processing server 106. In some cases, other components of the system 100, such as the user computing devices 102A-N, the computing device 104, the payment network nodes 110, and the exchange network nodes 114 can include the components illustrated in FIG. 2 and discussed below.

The processing server 106 can include a receiving device 202. The receiving device 202 can be configured to receive data over one or more networks via one or more network protocols. In some instances, the receiving device 202 can be configured to receive data from the user computing devices 102A-N, the computing devices 104A-N, the payment network nodes 110, the exchange network nodes 114, the loyalty network nodes 118, and other systems and entities via one or more communication methods, such as radio frequency, local area networks, wireless area networks, cellular communication networks, Bluetooth, the Internet, etc. In some embodiments, the receiving device 202 can be comprised of multiple devices, such as different receiving devices for receiving data over different networks, such as a first receiving device for receiving data over a local area network and a second receiving device for receiving data via the Internet. The receiving device 202 can receive electronically transmitted data signals, where data can be superimposed or otherwise encoded on the data signal and decoded, parsed, read, or otherwise obtained via receipt of the data signal by the receiving device 202. In some instances, the receiving device 202 can include a parsing module for parsing the received data signal to obtain the data superimposed thereon. For example, the receiving device 202 can include a parser program configured to receive and transform the received data signal into usable input for the functions performed by the processing device to carry out the methods and systems described herein.

The receiving device 202 can be configured to receive data signals electronically transmitted by user computing devices 102A-N, the computing devices 104A-N, the payment network nodes 110, the exchange network nodes 114, and the loyalty network nodes 118 that are superimposed or otherwise encoded with blockchain data entries, blockchain transactions, public keys, transaction requests, approval messages, onboarding requests, registration requests, etc. The receiving device 202 can also be configured to receive data signals electronically transmitted by user computing devices 102A-N, the computing devices 104A-N, the payment network nodes 110, the exchange network nodes 114, and the loyalty network nodes 118, which can be superimposed or otherwise encoded with registration data for new blockchain wallets, public keys, portions of transaction account numbers, hashed transaction account numbers, new blockchain transactions, etc. The receiving device 202 can also be configured to receive data signals electronically transmitted by payment network nodes 110 that can be superimposed or otherwise encoded with transaction data, etc.

The processing server 106 can also include a communication module 204. The communication module 204 can be configured to transmit data between modules, engines, databases, memories, and other components of the processing server 106 for use in performing the functions discussed herein. The communication module 204 can be comprised of one or more communication types and utilize various communication methods for communications within a computing device. For example, the communication module 204 can be comprised of a bus, contact pin connectors, wires, etc. In some embodiments, the communication module 204 can also be configured to communicate between internal components of the processing server 106 and external components of the processing server 106, such as externally connected databases, display devices, input devices, etc. The processing server 106 can also include a processing device. The processing device can be configured to perform the functions of the processing server 106 discussed herein as will be apparent to persons having skill in the relevant art. In some embodiments, the processing device can include and/or be comprised of a plurality of engines and/or modules specially configured to perform one or more functions of the processing device, such as the querying module 216, generation module 218, validation module 220, etc. As used herein, the term "module" can be software or hardware particularly programmed to receive an input, perform one or more processes using the input, and provides an output. The input, output, and processes performed by various modules will be apparent to one skilled in the art based upon the present disclosure.

The processing server 106 can also include the profile database 206. The profile database 206 can be configured to store one or more user loyalty profiles 208 using a suitable data storage format and schema. The profile database 206 can be a relational database that utilizes structured query language for the storage, identification, modifying, updating, accessing, etc., of structured data sets stored therein. The profile database may include one or more user loyalty profiles 208 and/or one or more merchant profiles 209. Each user loyalty profile 208 can be a structured data set configured to store data related to a user, e.g., the user computing device 102. A user loyalty profile 208 can include, for example, a public key of the cryptographic key pair of a related blockchain wallet, a portion of a transaction account number, a hashed transaction account number, a user identifier identifying a user, one or more merchant identifiers identifying one or more merchants, each of the one or more merchant identifiers associated with a loyalty point total identifying a number of loyalty points the user of the user loyalty profile 208 has with the associated merchant, one or more smart contracts as discussed in more detail above. Each merchant profile 209 can be a structured data set configured to store data related to a merchant, e.g., the computing device 104. A merchant profile 209 can include, for example, a merchant identification identifying the merchant, e.g., the computing device 104, a loyalty program identification identifying a loyalty program, e.g., the loyalty network 116, and one or more merchant-generated smart contracts as discussed above. In some embodiments, the profile database 206 can be a lookup table that can be accessed by the processing server 106 and one or more systems external to the processing server 106, such as user computing devices 102, the computing device 104, the payment network nodes 110, and the exchange network nodes 114, etc. In some embodiments, the profile database 206 can be a sidechain, that can be accessed by the processing server 106 and one or more systems external to the processing server 106, such as user computing devices 102, the computing device 104, the payment network nodes 110, and the exchange network nodes 114, etc.

The processing server 106 can also include blockchain data 210. The blockchain data 210 an include any data entries 212 associated with the exchange network 112, e.g., a copy of the blockchain associated with the exchange network 112, and/or data associated with the sidechain, e.g., the profile database 206 as described above.

The processing server 106 can also include a memory 214. The memory 214 can be configured to store data for use by the processing server 106 in performing the functions discussed herein, such as public and private keys, symmetric keys, etc. The memory 214 can be configured to store data using suitable data formatting methods and schema and can be any suitable type of memory, such as read-only memory, random access memory, etc. The memory 214 can include, for example, encryption keys and algorithms, communication protocols and standards, data formatting standards and protocols, program code for modules and application programs of the processing device, and other data that can be suitable for use by the processing server 106 in the performance of the functions disclosed herein as will be apparent to persons having skill in the relevant art. In some embodiments, the memory 214 can be comprised of or can otherwise include a relational database that utilizes structured query language for the storage, identification, modifying, updating, accessing, etc. of structured data sets stored therein. The memory 214 can be configured to store, for example, cryptographic keys, cryptographic key pairs, cryptographic algorithms, encryption algorithms, communication information, data formatting rules, network identifiers, transaction histories, blockchain wallet data, user loyalty profile data, merchant profile data, or any data stored in the profile database 206, blockchain data 210, etc.

The processing server 106 can include a querying module 216. The querying module 216 can be configured to execute queries on databases to identify information. The querying module 216 can receive one or more data values or query strings and can execute a query string based thereon on an indicated database, such as the profile database 206 of the processing server 106 to identify information stored therein. The querying module 216 can then output the identified information to an appropriate engine or module of the processing server 106 as necessary. The querying module 216 can, for example, execute a query on the profile database 206 to identify a user loyalty profile 208 associated a user computing device 102 and/or exchange network node 114 for a new loyalty point transaction to identify loyalty points stored therein for applicability to the new loyalty point transaction. The querying module 216 can, for example, execute a query on the profile database 206 to identify a merchant profile 209 associated with a computing device 104 and/or an exchange network node 114 to identify a merchant of the exchange network 112.

The processing server 106 can also include a generation module 218. The generation module 218 can be configured to generate data for use by the processing server 106 in performing the functions discussed herein. The generation module 218 can receive instructions as input, can generate data based on the instructions, and can output the generated data to one or more modules of the processing server 106. For example, the generation module 218 can be configured to generate data messages, notification messages, data entries, blockchain data entries, exchange request messages, onboarding response messages, onboarding notification messages, etc. For example, the processing server 106 may generate an exchange request to the exchange network 112 for the exchange of one or more loyalty points between exchange network nodes 114, e.g., user computing devices 102A and 102B.

The processing server 10 can also include a validation module 220. The validation module 220 can be configured to perform validations for the processing server 106 as part of the functions discussed herein. The validation module 220 can receive instructions as input, which can also include data to be used in performing a validation, can perform a validation as requested, and can output a result of the validation to another module or engine of the processing server 106. The processing server 106 may approve or deny a loyalty point transaction request based on the result of a validation. For example, if a blockchain transaction, e.g., loyalty point exchange request is not in compliance with one or more conditions of a smart contract, the processing server 106 may deny the loyalty point transaction request or otherwise prevent the loyalty point transaction request from being submitted to the exchange network 112 for confirmation.

The processing server 106 can also include a transmitting device 222. The transmitting device 222 can be configured to transmit data over one or more networks via one or more network protocols. In some instances, the transmitting device 222 can be configured to transmit data to the user computing devices 102, the computing device 104, the payment network nodes 110, the exchange network nodes 114, the loyalty network nodes 118, and other entities via one or more communication methods, local area networks, wireless area networks, cellular communication, Bluetooth, radio frequency, the Internet, etc. In some embodiments, the transmitting device 222 can be comprised of multiple devices, such as different transmitting devices for transmitting data over different networks, such as a first transmitting device for transmitting data over a local area network and a second transmitting device for transmitting data via the Internet. The transmitting device 222 can electronically transmit data signals that have data superimposed that can be parsed by a receiving computing device. In some instances, the transmitting device 222 can include one or more modules for superimposing, encoding, or otherwise formatting data into data signals suitable for transmission.

The transmitting device 222 can be configured to electronically transmit data signals to user computing devices 102, the computing device 104, the payment network nodes 110, the exchange network nodes 114, and the loyalty network nodes 118 that are superimposed or otherwise encoded with blockchain data, blockchain data entries, exchange rates, exchange requests, loyalty points, onboarding response messages, onboarding notifications, new blockchain transactions, etc.

Process for Exchanging Loyalty Points

FIGS. 4A-4D illustrate process 300 for exchanging loyalty points via the exchange network 112 in the system 100 of FIG. 1.

In step 302, the user computing device 102A initiates a transaction with the computing device 104. For example, the computing device 104 may be a merchant point-of-sale device and the user computing device 102 may transmit transaction data to the computing device 104 using any suitable communication means. Initiating the transaction can include transmitting payment data including at least a transaction account number to the computing device 104. Upon initiation of the transaction, the user computing device 102A may select an indication that the transaction is to be paid for with loyalty points and the transaction data may include an indication of the user selection to pay with loyalty points. In step 304, the computing device 104 receives the payment data from the user computing device 102A.

In step 306, the computing device 104 generates a transaction request including at least a user identification, a merchant identification, and a transaction amount and transmits the transaction request in step 308 to the processing server 106. The user identification may identify the user computing device 102A and/or identify a user associated with the user computing device 102A. The merchant identification may identify a merchant at which the transaction is being processed, e.g., the merchant at which the transaction has been initiated by the user computing device 102A. In embodiments, the computing device 104 is associated with the merchant identifier. The transaction amount is the total cost for the transaction being processed by the computing device 104. The generating of the transaction request by the computing device 104 may be in response to the transaction data including an indication of a user selection to pay with loyalty points.

In step 310, the processing server 106 receives (e.g., via the receiving device 202), the transaction request from the computing device 104. In step 312, the processing server executes (e.g., via the querying module 216) a query on the profile database 206. The query may include at least the user identification included in the transaction request. In step 314, the processing server 106 identifies a user loyalty profile 208 that includes a user identifier that matches the user identification included in the transaction request. For example, the processing server identifies a user loyalty profile associated with the user computing device 102A and/or a user associated with the user computing device 102A.

In step 316, in response to identifying the user loyalty profile, the processing server 106 determines if the merchant identification included in the transaction request matches a merchant identifier in the identified user loyalty profile. For example, the processing server 106 determines if the user associated with the identified user loyalty profile has a loyalty account with the merchant associated with the merchant identification included in the transaction request. If the processing server 106 determines that the identified user loyalty profile does not include a merchant identifier matching the merchant identification included in the transaction request, i.e., the user does not have a loyalty account, the process proceeds to step 320. If the processing server 106 determines that the identified user loyalty profile does include a merchant identifier matching the merchant identification included in the transaction request, i.e., the user does have a loyalty account, the process proceeds to step 318.

In step 318, the processing server 106 determines if the loyalty point total associated with the matching merchant identifier included in the identified user loyalty profile is lower than a loyalty point total required to cover the transaction amount included in the transaction request. Loyalty points may have different monetary values such that each loyalty point may be equal to or less than one unit of currency, e.g., one U.S. dollar. For example, each loyalty point associated with the merchant identification may have a value of ten cents and the transaction amount may be ten dollars. Continuing with the previous example, the identified user loyalty profile would need to contain one hundred loyalty points associated with the merchant identification included in the transaction request in order to cover the full transaction amount. If the processing server determines that the point total associated with the matching merchant identifier included in the identified user loyalty profile is equal to or greater than a loyalty point total required to cover the transaction amount included in the transaction request, the process proceeds to step 358. If the processing server determines that the point total associated with the matching merchant identifier included in the identified user loyalty profile is less than a loyalty point total required to cover the transaction amount included in the transaction request, the process proceeds to step 320.

In step 320, the processing server 106 identifies a second amount of loyalty points on a loyalty point exchange, e.g., the exchange network 112. The second amount of loyalty points being loyalty points associated with the merchant identifier that matched the merchant identification included in the transaction request listed for exchange by another user of the exchange network 112, e.g., an exchange node 114. The second amount of loyalty points may be equal to the loyalty point total required to cover the transaction amount, e.g., if the identified user loyalty profile has no loyalty points associated with the merchant identifier, or the second amount of loyalty points may be a difference between the loyalty points associated with the merchant identifier stored in the identified user loyalty profile and the loyalty point total required to cover the transaction amount. The loyalty point exchange 112 may host a listing of available loyalty points for exchange associated with each of the one or more merchants associated with the merchant identifiers listed for exchange by other users of the loyalty point exchange 112, e.g., other exchange nodes 114. In embodiments, no one loyalty exchange node 114 of the loyalty point exchange 112 may have enough loyalty points equal to the second amount of loyalty points and the processing server 106 may identify a plurality of loyalty point exchange nodes 114 that together have enough loyalty points equal to the second amount of loyalty points.

In step 322, the processing server 106 identifies an exchange rate of loyalty points for the merchant identifier that matched the merchant identification included in the transaction request, e.g., the second amount of loyalty points, and loyalty points for the different merchant identifier of the one or more merchant identifiers included in the identified user loyalty profile. For example, the identified user loyalty profile 208 may have loyalty points for merchant B and the identified second amount of loyalty points on the exchange network 112 includes an exchange rate of the second amount of loyalty points for the loyalty points of merchant B. Continuing with the previous example, the exchange rate may be 2:1 such that two merchant B loyalty points are worth one loyalty point of the merchant associated merchant identifier that matched the merchant identification included in the transaction request. Therefore, if the amount of loyalty points required to cover the transaction amount is one hundred, the exchange rate would be two hundred merchant B loyalty points for one hundred loyalty points of the merchant associated merchant identifier that matched the merchant identification included in the transaction request.

In step 324, the processing server 106 transmits, e.g., via the transmitting device 222, the exchange rate to the computing device 104. The computing device 104 receives the exchange rate at step 326 and transmits the exchange rate to the user computing device 102A in step 328. The transmission of the exchange rate between the processing server 106, the computing device 104, and the user computing device 102A may be via one or more data messages between the devices using any suitable communication method.

In step 330, the user computing device 102A receives the exchange rate from the computing device 104. In step 332, the user computing device 102A generates an exchange approval message approving the exchange rate received from the computing device 104. If the user does not approve the exchange rate, the computing device 104 may process the transaction as a regular purchase transaction, e.g., using the payment network 108. Alternatively, if the user does not approve the exchange rate, the process may proceed through steps 320-330 with a different second amount of loyalty points listed by a different exchange node 114 that may have a between exchange rate. In step 334, the user computing device 102A transmits the exchange approval message to the computing device 104 which received the exchange approval message in step 336 and sends the exchange approval message to the processing server 106 in step 338.

In step 340, the processing server 106 receives, e.g., via the receiving device 202, the exchange approval message from the computing device 104. In step 342, the processing server 106 generates, e.g., via the generation module 218, an exchange request. The exchange request may include at least a first loyalty point request amount equal to the amount of loyalty points needed to cover the transaction amount, the user identifier of the identified user loyalty profile, and the merchant identifier that matched the merchant identification included in the transaction request. In step 344, the processing server 106 transmits, e.g., via the transmitting device 222, the exchange request to the loyalty point exchange 112, e.g., to one or more loyalty point exchange nodes 114. For example, the processing server 106 transmits the exchange request to the loyalty point exchange node 114 associated with the identified second amount of loyalty points. In embodiments, the processing server 106 may generate a plurality of exchange requests and transmit each exchange request to a different loyalty point exchange node 114 such as when the second amount of loyalty points is held by multiple different users, e.g., multiple loyalty point exchange nodes 114.

In step 346, the loyalty exchange network 112 receives, e.g., one or more loyalty exchange nodes 114 receives the exchange request, from the processing server 106. In step 348, the loyalty exchange network 112 executes the loyalty point exchange of the exchange request. For example, the loyalty points from the user associated with user computing device 102A are exchanged for the second amount of loyalty points of the one or more other users associated with the one or more loyalty point exchange nodes 114. In step 350, the loyalty point exchange 112, e.g., the one or more loyalty point exchange nodes 114, transmits the second amount of loyalty points to the processing server 106.

In step 352, the processing server 106 receives, e.g., via the receiving device 202, from the one or more loyalty point exchange nodes 114 of the exchange network 112. In step 354, the processing server 106 transmits, e.g., the transmitting device 222, the second amount of loyalty points to the computing device 104 and the computing device 104 in step 356 and processes the transaction in step 358. Alternatively, in step 354, the processing server 106 can transmit the second amount of loyalty points to the user computing device 102A and the user computing device 102A can transmit the second amount of loyalty points to the computing device 104 for transaction processing.

Process for Exchanging Loyalty Points in a Peer-to-Peer Exchange

Figure 5:
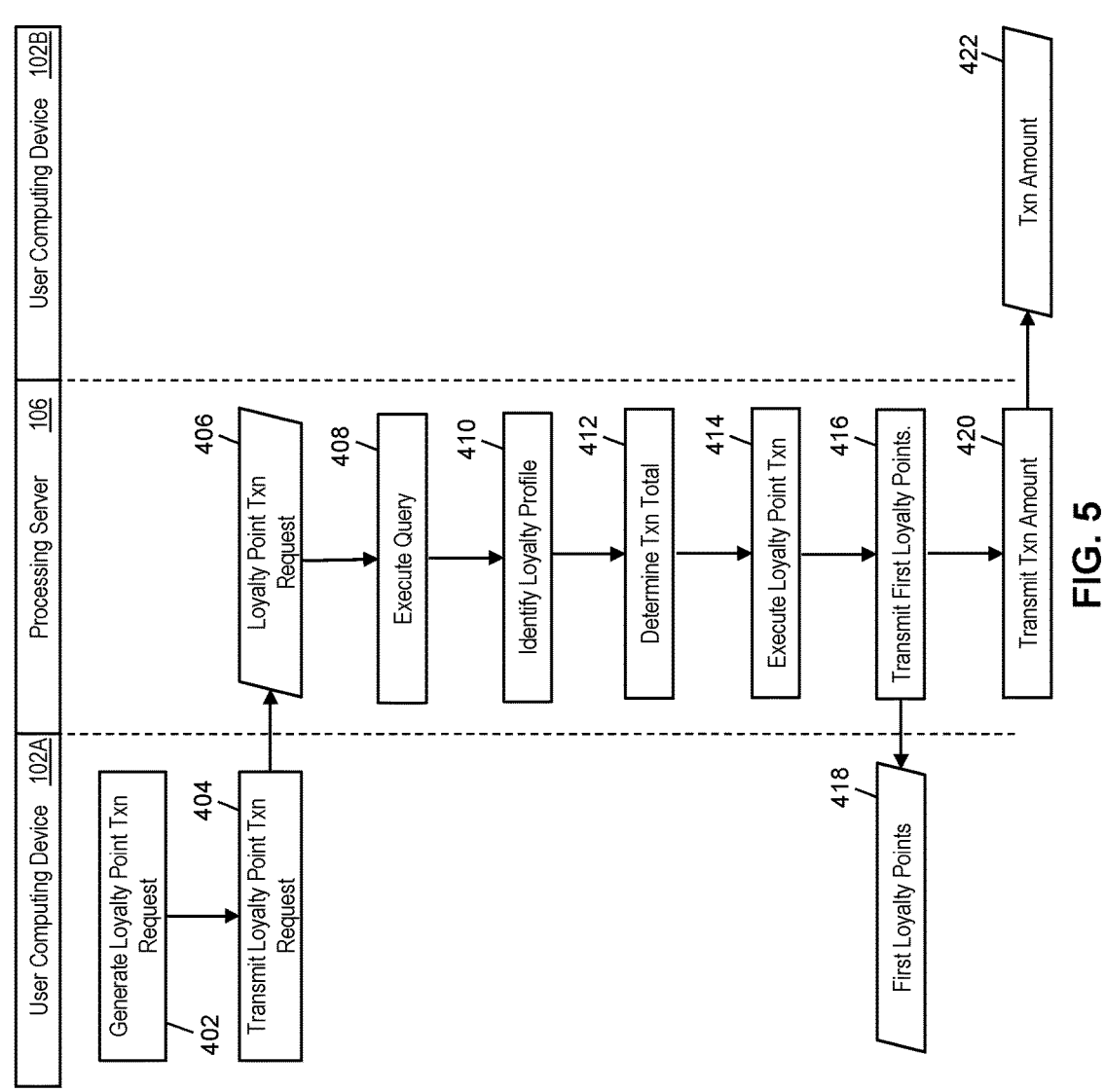
FIG. 5 is a flow diagram illustrating a process for exchanging loyalty points in the system 100 in accordance with exemplary embodiments.

FIG. 5 illustrates process 400 for exchanging loyalty points via the exchange network 112 in the system 100 of FIG. 1.

In step 402, the user computing device 102A generates a loyalty point transaction request. The loyalty point transaction request may include a user identification, e.g., an identification of a user on the exchange network 112 and/or a loyalty point exchange node 114 on the exchange network 112, a first loyalty point amount of first loyalty points, e.g., loyalty points associated with a first loyalty point program of a merchant. The first loyalty point request amount may be associated with a first merchant identifier, e.g., an identifier of a particular merchant and/or loyalty point program. For example, a user associated with the user computing device 102A identifies one or more loyalty points associated with a loyalty program, e.g., merchant A, on the loyalty point exchange 112 that the user would like to purchase and/or exchange with loyalty points associated with a different loyalty point program, e.g., merchant B. In step 404, the user computing device 102A transmits the loyalty point transaction request to the processing server 106. The processing server 106 may host the exchange network 112 and/or the processing server 106 may be a node on the exchange network 112, e.g., a loyalty point exchange node 114.

In step 406, the processing server 106 receives, e.g., via the receiving device 202, the loyalty point exchange request from the user computing device 102A. In step 408, the processing server 106 executes a query, e.g., via the querying module 216, on a database, e.g., the profile database 206. The query may include at least the user identification included in the loyalty point transaction request. In step 410, the processing server 106 identifies a user loyalty profile 208 including the user identification included in the loyalty point transaction request. The identified user loyalty profile 208 may include at least one merchant identifier matching the first merchant identifier. The merchant identifier may be associated with a loyalty point total and a loyalty point exchange rate. In an embodiment, the exchange rate may be a cryptocurrency value of each first loyalty point and the transaction total may be a cryptocurrency amount equal to the first loyalty point request amount based on the exchange rate. In an embodiment, the exchange rate may be a value of second loyalty points associated with a second merchant identifier equal to each first loyalty point associated with the first merchant identifier and the transaction total may be a second loyalty point amount equal to the first loyalty point request amount based on the exchange rate. The exchange rate may be set by a merchant associated with the merchant identifier and/or the exchange rate may be set by a user associated with the identified user loyalty profile 208.

In step 412, the processing server 106 determines a transaction total for the loyalty point transaction request. The transaction total may be based on the loyalty point exchange rate, e.g., the exchange rate in the identified user loyalty profile 208, and the first loyalty point request amount. In step 414, the processing server 106 executes a loyalty point transaction, e.g., based on the loyalty point transaction request. In an embodiment, the processing server 106 may determine the transaction total and/or execute the loyalty point transaction using a smart contract. For example, the user loyalty t profile 208 may include a smart contract for executing loyalty point exchanges with the associated user of the user loyalty profile 208. In an embodiment, the processing server 106 may transmit, e.g., via the transmitting device 222, the transaction total to the user computing device 102A for approval of the transaction total. The processing server 106 may also receive, e.g., via the receiving device 202, an approval of the transaction total and a transaction amount equal to the transaction total from the user computing device 102A.

In step 416, the processing server 106 transmits, e.g., via the transmitting device 222, the first loyalty points equal to the first loyalty point request amount to the user computing device 102A. In step 418, the user computing device 102A receives the first loyalty points.

In step 420, the processing server 106 transmits, e.g., via the transmitting device 222, a transaction amount equal to the transaction total to the user computing device 102B, e.g., the computing device associated with the identified user loyalty point profile 208. In step 422, the user computing device 102B receives the transaction amount.

Process for Onboarding to Loyalty Point Exchange Network

Figure 6:
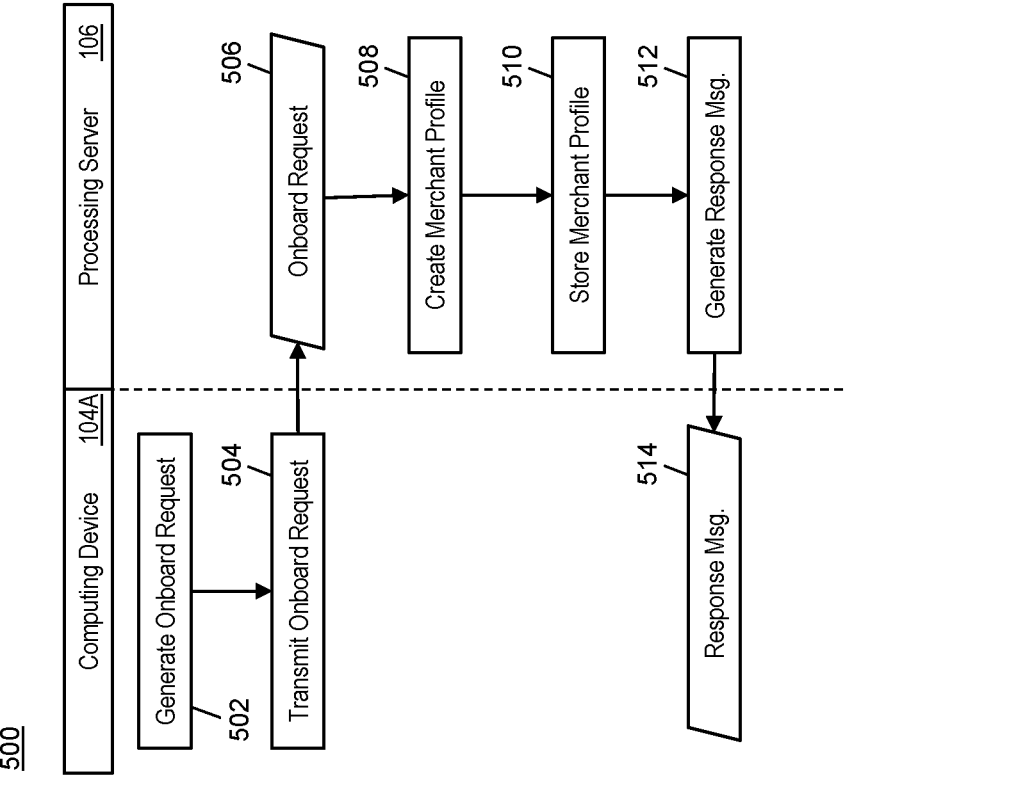
FIG. 6 is a flow diagram illustrating a process for onboarding merchants in the system 100 in accordance with exemplary embodiments.

FIG. 6 illustrates process 500 for onboarding to the exchange network 112 in the system 100 of FIG. 1.

In step 502, a merchant, e.g., via the computing device 104A, generates an onboarding request to join the processing server 106, which may be a node, e.g., an exchange network node 114, of the exchange network 112. For example, a merchant may want to allow members of its loyalty program, e.g., users associated with the user computing devices 102, to sell and/or exchange their loyalty points via the exchange network 112. The merchant, e.g., via the computing device 104A, may access the exchange network 112 via a website and fill out an online form to create an account with the exchange network 112. For example, the merchant, e.g., via the computing device 104A, may enter a merchant identification, e.g., a business name, and a loyalty program identification. In an exemplary embodiment, the merchant will have an existing loyalty program powered by Web 3.0 technology, e.g., an existing decentralized loyalty program network, having one or more smart contracts that control the implementation of the loyalty program. In an exemplary embodiment, the merchant will connect one of the one or more smart contracts of the merchant's decentralized loyalty program network to the exchange network 112 or create a new smart contract to connect to the exchange network 112. In an exemplary embodiment, the exchange network 112 is a cross-chain network linking a plurality or merchant decentralized loyalty program networks. Cross-chain networks are described more fully in U.S. Pat. No. 11,689,355 issued on Jun. 27, 2023, entitled "METHOD AND SYSTEM FOR THE ATOMIC EXCHANGE OF BLOCKCHAIN ASSETS USING TRANSIENT KEY PAIRS," the contents of which are incorporated herein by reference in their entirety.

In step 504, the merchant, e.g., via the computing device 104A, transmits the onboarding request to the exchange network 112, e.g., via the processing server 106 and/or an exchange network node 114. In step 506, the exchange network 112, e.g., via the processing server 106 and/or an exchange network node 114, receives the onboarding request from the merchant, e.g., via the computing device 104A.

In step 508, the exchange network 112, e.g., via the processing server 106 and/or an exchange network node 114, creates a profile for the merchant, e.g., the merchant profile 209. The merchant profile 209 may include the merchant identification, the loyalty program identification, and one or more smart contracts. In step 510, the exchange network 112, e.g., via the processing server 106 and/or an exchange network node 114, stores the merchant profile 209 in a database, e.g., the database 206.

In step 512, the exchange network 112, e.g., via the processing server 106 and/or an exchange network node 114, generates a response message to the onboarding request. For example, the exchange network 112 may generate an approval or denial of the onboarding request. Further, the response message may include login information, e.g., a username and password, for the merchant to login to the exchange network 112. In step 514, the exchange network 112, e.g., via the processing server 106 and/or an exchange network node 114, transmits the response message to the merchant, e.g., the computing device 104A.

Process for Onboarding to Loyalty Point Exchange Network

Figure 7:
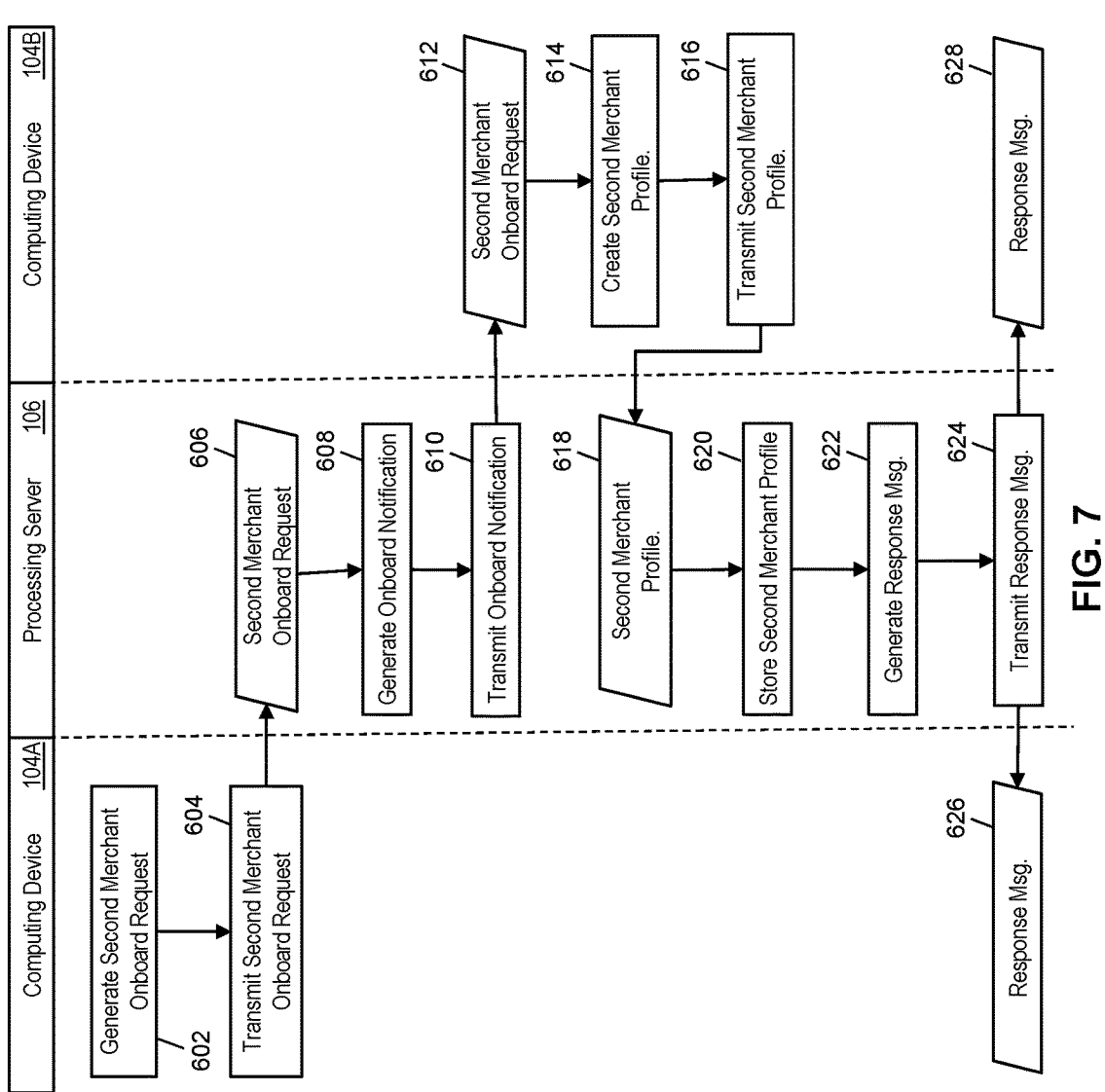
FIG. 7 is a flow diagram illustrating a process for onboarding merchants in the system 100 in accordance with exemplary embodiments.

FIG. 7 illustrates process 600 for onboarding to the exchange network 112 in the system 100 of FIG. 1. In an exemplary embodiment, a first merchant, e.g., the computing device 104A, may onboard a second merchant, e.g., the computing device 104B, to the exchange network 112, e.g., via the processing server 106. In the process 600, the processing server 106 a part of the exchange network 112, e.g., the processing server 106 may be an exchange network node 114, or the processing server 106 may act as an intermediary between the computing devices 104 and the exchange network 112. Accordingly, while the processing server 106 is described below as acting as the exchange network 112 in the process 600, it can be appreciated that the processing server 106 may be an exchange network node 114 and/or be in communication with one or more exchange network nodes 114 of the exchange network 112.

In step 602, a first merchant, e.g., the computing device 104A, generates a second merchant onboarding request to request onboarding of a second merchant, e.g., the computing device 104B, to the exchange network 112. For example, the exchange network 112 may require an existing member of the exchange network 112 to sponsor a new member wishing to join to exchange network 112. Alternatively, a first merchant may wish to have a second merchant join the exchange network and the first merchant may generate a second merchant onboarding request as an invitation to the second merchant to join the exchange network 112. The second merchant onboarding request may include one or more of a second merchant identification, e.g., a merchant name or identification number, and a second merchant address, e.g., an electronic messaging address. In step 604, the first merchant, e.g., the computing device 104A, transmits the second merchant onboarding request to the exchange network 112, e.g., via the processing server 106 and/or one or more exchange network nodes 114.

In step 606, the processing server 106 receives, e.g., via the receiving device 202, the second merchant onboarding request from the first merchant, e.g., from the computing device 104A. In step 608, the processing server 106 generates, e.g., via the generation module 218, an onboard notification for the second merchant. The onboard notification notifying the second merchant that the first merchant has requested that the second merchant join the exchange network 112. Further, the onboard notification may prompt the second merchant to create a merchant profile, e.g., a merchant profile 209, for the exchange network 112. In step 610, the processing server 106 transmits, e.g., via the transmitting device 222, the onboard notification to the second merchant, e.g., the computing device 104B. The processing server 106 may transmit the onboard notification to the merchant address included in the second merchant onboarding request.

In step 612, the second merchant, e.g., the computing device 104B, receives the onboard notification from the processing server 106. In step 614, the second merchant, e.g., the computing device 104B, creates a second merchant profile, e.g., a merchant profile 209, and transmits the second merchant profile to the processing server 106 in step 616. The second merchant profile may include the second merchant identification, a second merchant loyalty program identification, and one or more second merchant smart contracts.

In step 618, the processing server 106 receives, e.g., via the receiving device 202, the second merchant profile, e.g., a merchant profile 209, and stores the second merchant profile in step 620. For example, the processing server 106 may store the second merchant profile, e.g., a merchant profile 209, in a database, e.g., the database 206.

In step 622, the processing server 106 generates, e.g., via the generation module 218, a response message. The response message confirming the onboarding of the second merchant to the exchange network 112. In step 624, the processing server 106 transmits, e.g., via the transmitting device 222, the response message to the computing devices 104A and 104B, which received the response message in steps 626 and 628, respectively.

Exemplary Method for Exchanging Loyalty Points

FIGS. 8A-8B illustrate method 700 for exchanging loyalty points in the system 100 of FIG. 1.

In step 702, a processing server, e.g., the processing server 106, stores, a database, e.g., the database 206. The database, e.g., the database 206, may include one or more user loyalty profiles, e.g., user loyalty profiles 208, and each of the one or more user loyalty profiles may include at least a user identifier identifying a user and one or more merchant identifiers identifying one or more merchants, each of the one or more merchant identifiers associated with a loyalty point total. The loyalty point total being a number of loyalty points the user of the user loyalty profile has with the associated merchant.

In step 704, the processing server, e.g., the processing server 106, receives, e.g., via the receiving device 202, a transaction request from a computing system, e.g., a user computing device 102. The transaction request may include at least a user identification, a merchant identification, and a transaction amount.

In step 706, the processing server, e.g., the processing server 106, executes a query, e.g., via the querying module 216, on the database, e.g., the database 206. The query may include at least the user identification included in the transaction request.

In step 708, the processing server, e.g., the processing server 106, identifies a user loyalty profile, e.g., a user loyalty profile 208, that includes a user identifier that matches the user identification included in the transaction request.

In step 710, in response to identifying the user loyalty profile, e.g., the user loyalty profile 208, the processing server, e.g., the processing server 106, determines the merchant identification included in the transaction request matches one of the one or more merchant identifiers in the identified user loyalty profile, e.g., the user loyalty profile 208.

In step 712, the processing server, e.g., the processing server 106, determines the loyalty point total associated with the matching merchant identifier included in the identified user loyalty profile, e.g., the user loyalty profile 208, is lower than a loyalty point total required to cover the transaction amount.

In step 714, the processing server, e.g., the processing server 106, exchanges a first amount of loyalty points associated with a different merchant identifier of the one or more merchant identifiers included in the identified user loyalty profile, e.g., the user loyalty profile 208, for a second amount of loyalty points associated with the merchant identifier that matched the merchant identification included in the transaction request. The second amount of loyalty points may be a difference between the loyalty points associated with the merchant identifier stored in the identified user loyalty profile, e.g., the user loyalty profile 208, and the loyalty point total required to cover the transaction amount.

In embodiments, exchanging the first amount of loyalty points for the second amount of loyalty points may include the processing server, e.g., the processing server 106, identifying the second amount of loyalty points on a loyalty point exchange, e.g., the exchange 112, that hosts a listing of available loyalty points for exchange associated with each of the one or more merchants. In an embodiment, the loyalty point exchange, e.g., the exchange network 112, may be a decentralized exchange network such as a blockchain network and each loyalty point listed on the loyalty point exchange, e.g., the exchange network 112, may be represented by a digital token. In an embodiment, the loyalty point exchange, e.g., the exchange network 112, may be a cross-chain network connecting one or more blockchains where each of the one or more blockchains may be associated with a different merchant, e.g., computing device 104, and each of the one or more blockchains may include user loyalty points associated with each of the different merchants available for exchange via the decentralized exchange network, e.g., the exchange network 112. Identifying the second amount of loyalty points on the loyalty point exchange, e.g., the exchange 112, may include the processing server, e.g., the processing server 106, identifying an exchange rate of loyalty points for the merchant identifier that matched the merchant identification included in the transaction request and loyalty points for the different merchant identifier of the one or more merchant identifiers included in the identified user loyalty profile. The exchange rate may be based on the total number of loyalty points for the merchant identifier that matched the merchant identification included in the transaction request and the total number of loyalty points for the different merchant identifier of the one or more merchant identifiers included in the identified user loyalty profile, e.g., the user loyalty profile 208, that are available for exchange on the loyalty point exchange, e.g., the exchange 112. Alternatively, the exchange rate may be a set exchange rate set by the exchange 112, the user selling the loyalty points on the exchange 112, and/or the merchant associated with the loyalty points. In embodiments, prior to the exchanging the first amount of loyalty points for the second amount of loyalty points, the processing server, e.g., the processing server 106, transmits, e.g., via the transmitting device 222, the exchange rate to the computing system, e.g., the user computing device 102, and may receive, e.g., via the receiving device 202, an approval from the computing system, e.g., the user computing device 102, of the exchange rate.

In embodiments, exchanging the first amount of loyalty points for the second amount of loyalty points, may include the processing server, e.g., the processing server 106, may transmit, e.g., via the transmitting device 222, an exchange request to the loyalty point exchange, e.g., the exchange network 112. The exchange request may include at least the first amount of loyalty points, the user identifier of the identified user loyalty profile, e.g., the user loyalty profile 208, and the merchant identifier that matched the merchant identification included in the transaction request. Further, the processing server, e.g., the processing server 106 may receive, e.g., via the receiving device 202, the second amount of loyalty points from the exchange network 112.

In embodiments, exchanging the first amount of loyalty points for the second amount of loyalty points may be facilitated by a smart contract. The smart contract may include one or more conditions for the exchange of the loyalty points associated with the different merchant identifier of the one or more merchant identifiers included in the identified user loyalty profile and the loyalty points associated with the merchant identifier that matched the merchant identification included in the transaction request. The loyalty point exchange, e.g., the exchange network 112, may include a smart contract associated with each of the one or more merchants and each smart contract may include one or more conditions for the exchange of loyalty points of the associated merchant. The one or more conditions of each smart contract may include an exchange on/off condition that defines a threshold number of loyalty points of the associated merchant that can be exchanged in a defined period of time.

In step 716, the processing server, e.g., the processing server 106, transmits, e.g., via the transmitting device 222, a response message to the computing system, e.g., the user computing device 102. The response message may include an identification of a third amount of loyalty points associated with the merchant identifier that matched the merchant identification included in the transaction request. The third amount of loyalty points may be a total of the loyalty point total associated with the matching merchant identifier and the second amount.

Exemplary Method for Exchanging Loyalty Points

FIG. 9 illustrates method 800 for exchanging loyalty points in the system 100 of FIG. 1.

In step 802, a processing server, e.g., the processing server 106, receives, e.g., via the receiving device 202, a loyalty point transaction request from a first computing device, e.g., the user computing device 102A. The loyalty point transaction action request may include at least a user identification, a first loyalty point request amount of first loyalty points associated with a first merchant identifier.

In step 804, the processing server, e.g., the processing server 106, executes, e.g., via the querying module 216, a query on a database, e.g., the database 206. The query including at least the user identification included in the loyalty point transaction request.

In step 806, the processing server, e.g., the processing server 106, identifies a user loyalty profile, e.g., a user loyalty profile 208, including the user identification included in the loyalty point transaction request. The user loyalty profile, e.g., the user loyalty profile 208, may include at least one merchant identifier matching the first merchant identifier. The merchant identifier included in the identified user loyalty profile, e.g., the user loyalty profile 208, may be associated with a loyalty point total and a loyalty point exchange rate. In an embodiment, the exchange rate may be a cryptocurrency value of each first loyalty point and the transaction total may be a cryptocurrency amount equal to the first loyalty point request amount based on the exchange rate. In an embodiment, the exchange rate may be a value of second loyalty points associated with a second merchant identifier equal to each first loyalty point associated with the first merchant identifier and the transaction total may be a second loyalty point amount equal to the first loyalty point request amount based on the exchange rate. In an embodiment, the exchange rate may be set by a merchant associated with the merchant identifier.

In step 808, the processing server, e.g., the processing server 106, determines a transaction total for the loyalty point transaction request. The transaction total may be based on the loyalty point exchange rate and the first loyalty point request amount. In embodiments, the determining of the transaction total and the executing of the loyalty point transaction by the processing server, e.g., the processing server 106, are performed via a smart contract.

In step 810, the processing server, e.g., the processing server 106, executes a loyalty point transaction. In embodiments, executing the loyalty point transaction may include the processing server, e.g., the processing server 106, transmitting, e.g., via the transmitting device 222, the first loyalty points equal the first loyalty point request amount to the first computing device, e.g., the user computing device 102A. In embodiments, executing the loyalty point transaction may include the processing server, e.g., the processing server 106, transmitting, e.g., via the transmitting device 222, a transaction amount equal to the transaction total to a second computing device, e.g., the user computing device 102B.

In embodiments, prior to executing the loyalty point transaction, the processing server, e.g., the processing server 106, may transmit, e.g., via the transmitting device 222, the transaction total to the first computing device, e.g., the user computing device 102A, and receive, e.g., via the receiving device 202, an approval of the transaction total and a transaction amount equal to the transaction total from the first computing device, e.g., the user computing device 102A. In some embodiments, the processing server, e.g., the processing server 106, may store, e.g., in the database 206, a smart contract associated the merchant identifier. The smart contract may include one or more conditions for the exchange of loyalty points of the associated merchant. The one or more conditions of the smart contract may include an exchange on/off condition that defines a threshold number of loyalty points of the associated merchant that can be exchanged in a defined period of time.

Computer System Architecture

FIG. 10 illustrates computer system 900 in which embodiments of the present disclosure, or portions thereof, can be implemented as computer-readable code. For example, the user computing device 102, the computing device 104, the processing server 106, the payment network nodes 110, and/or the exchange network nodes 114 can be implemented in the computer system 900 using hardware, non-transitory computer readable media having instructions stored thereon, or a combination thereof and can be implemented in one or more computer systems or other processing systems. Hardware can embody modules and components used to implement the processes and methods of FIGS. 4-9.

If programmable logic is used, such logic can execute on a commercially available processing platform configured by executable software code to become a specific purpose computer or a special purpose device (e.g., programmable logic array, application-specific integrated circuit, etc.). A person having ordinary skill in the art can appreciate that embodiments of the disclosed subject matter can be practiced with various computer system configurations, including multi-core multiprocessor systems, minicomputers, mainframe computers, computers linked or clustered with distributed functions, as well as pervasive or miniature computers that can be embedded into virtually any device. For instance, at least one processor device and a memory can be used to implement the above-described embodiments.

A processor unit or device as discussed herein can be a single processor, a plurality of processors, or combinations thereof. Processor devices can have one or more processor "cores." The terms "computer program medium," "non-transitory computer readable medium," and "computer usable medium" as discussed herein are used to generally refer to tangible media such as a removable storage unit 918, a removable storage unit 922, and a hard disk installed in hard disk drive 912.

Various embodiments of the present disclosure are described in terms of this example computer system 900. After reading this description, it will become apparent to a person skilled in the relevant art how to implement the present disclosure using other computer systems and/or computer architectures. Although operations can be described as a sequential process, some of the operations can in fact be performed in parallel, concurrently, and/or in a distributed environment, and with program code stored locally or remotely for access by single or multi-processor machines. In addition, in some embodiments the order of operations can be rearranged without departing from the spirit of the disclosed subject matter.

Processor device 904 can be a special purpose or a general-purpose processor device specifically configured to perform the functions discussed herein. The processor device 904 can be connected to a communications infrastructure 906, such as a bus, message queue, network, multi-core message-passing scheme, etc. The network can be any network suitable for performing the functions as disclosed herein and can include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 900 can also include a main memory 908 (e.g., random access memory, read-only memory, etc.), and can also include a secondary memory 910. The secondary memory 910 can include the hard disk drive 912 and a removable storage drive 914, such as a floppy disk drive, a magnetic tape drive, an optical disk drive, a flash memory, etc.

The removable storage drive 914 can read from and/or write to the removable storage unit 918 in a well-known manner. The removable storage unit 918 can include a removable storage media that can be read by and written to by the removable storage drive 914. For example, if the removable storage drive 914 is a floppy disk drive or universal serial bus port, the removable storage unit 918 can be a floppy disk or portable flash drive, respectively. In one embodiment, the removable storage unit 918 can be non-transitory computer readable recording media.

In some embodiments, the secondary memory 910 can include alternative means for allowing computer programs or other instructions to be loaded into the computer system 900, for example, the removable storage unit 922 and an interface 920. Examples of such means can include a program cartridge and cartridge interface (e.g., as found in video game systems), a removable memory chip (e.g., EEPROM, PROM, etc.) and associated socket, and other removable storage units 922 and interfaces 920 as will be apparent to persons having skill in the relevant art.

Data stored in the computer system 900 (e.g., in the main memory 908 and/or the secondary memory 910) can be stored on any type of suitable computer readable media, such as optical storage (e.g., a compact disc, digital versatile disc, Blu-ray disc, etc.) or magnetic tape storage (e.g., a hard disk drive). The data can be configured in any type of suitable database configuration, such as a relational database, a structured query language (SQL) database, a distributed database, an object database, etc. Suitable configurations and storage types will be apparent to persons having skill in the relevant art.

The computer system 900 can also include a communications interface 924. The communications interface 924 can be configured to allow software and data to be transferred between the computer system 900 and external devices. Exemplary communications interfaces 924 can include a modem, a network interface (e.g., an Ethernet card), a communications port, a PCMCIA slot and card, etc. Software and data transferred via the communications interface 924 can be in the form of signals, which can be electronic, electromagnetic, optical, or other signals as will be apparent to persons having skill in the relevant art. The signals can travel via a communications path 926, which can be configured to carry the signals and can be implemented using wire, cable, fiber optics, a phone line, a cellular phone link, a radio frequency link, etc.

The computer system 900 can further include a display interface 902. The display interface 902 can be configured to allow data to be transferred between the computer system 900 and external display 930. Exemplary display interfaces 902 can include high-definition multimedia interface (HDMI), digital visual interface (DVI), video graphics array (VGA), etc. The display 930 can be any suitable type of display for displaying data transmitted via the display interface 902 of the computer system 900, including a cathode ray tube (CRT) display, liquid crystal display (LCD), light-emitting diode (LED) display, capacitive touch display, thin-film transistor (TFT) display, etc.

Computer program medium and computer usable medium can refer to memories, such as the main memory 908 and secondary memory 910, which can be memory semiconductors (e.g., DRAMs, etc.). These computer program products can be means for providing software to the computer system 900. Computer programs (e.g., computer control logic) can be stored in the main memory 908 and/or the secondary memory 910. Computer programs can also be received via the communications interface 924. Such computer programs, when executed, can enable computer system 900 to implement the present methods as discussed herein. In particular, the computer programs, when executed, can enable processor device 904 to implement the processes and methods illustrated by FIGS. 4-9, as discussed herein. Accordingly, such computer programs can represent controllers of the computer system 900. Where the present disclosure is implemented using software, the software can be stored in a computer program product and loaded into the computer system 900 using the removable storage drive 914, interface 920, and hard disk drive 912, or communications interface 924.

The processor device 904 can comprise one or more modules or engines configured to perform the functions of the computer system 900. Each of the modules or engines can be implemented using hardware and, in some instances, can also utilize software, such as corresponding to program code and/or programs stored in the main memory 908 or secondary memory 910. In such instances, program code can be compiled by the processor device 904 (e.g., by a compiling module or engine) prior to execution by the hardware of the computer system 900. For example, the program code can be source code written in a programming language that is translated into a lower-level language, such as assembly language or machine code, for execution by the processor device 904 and/or any additional hardware components of the computer system 900. The process of compiling can include the use of lexical analysis, preprocessing, parsing, semantic analysis, syntax-directed translation, code generation, code optimization, and any other techniques that can be suitable for translation of program code into a lower-level language suitable for controlling the computer system 900 to perform the functions disclosed herein. It will be apparent to persons having skill in the relevant art that such processes result in the computer system 900 being a specially configured computer system 900 uniquely programmed to perform the functions discussed above.

Techniques consistent with the present disclosure provide, among other features, systems and methods for account type registration for blockchain wallets. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or can be acquired from practicing of the disclosure, without departing from the breadth or scope.

What is claimed is:

1. A method for exchanging loyalty points, comprising:

storing, by a processing server, a database, the database including one or more user loyalty profiles, each of the one or more user loyalty profiles including at least a user identifier identifying a user and one or more merchant identifiers identifying one or more merchants, each of the one or more merchant identifiers associated with a loyalty point total;

receiving, by a computing system, transaction data for a transaction, the transaction data including user payment data and an indication of a user selection to pay with loyalty points;

generating, by the computing system, a transaction request including a user identification, a merchant identification, and a transaction amount;

transmitting, by the computing system, the transaction request to the processing server;

receiving, by the processing server, the transaction request from a computing system;

executing, by the processing server, a query on the database, the query including at least the user identification included in the transaction request;

identifying, by the processing server, a user loyalty profile including a user identifier that matches the user identification included in the transaction request;

in response to identifying the user loyalty profile, determining, by the processing server, the merchant identification included in the transaction request matches one of the one or more merchant identifiers in the identified user loyalty profile;

determining, by the processing server, the loyalty point total associated with the matching merchant identifier included in the identified user loyalty profile is lower than a loyalty point total required to cover the transaction amount;

exchanging, by the processing server, a first amount of loyalty points associated with a different merchant identifier of the one or more merchant identifiers included in the identified user loyalty profile for a second amount of loyalty points associated with the merchant identifier that matched the merchant identification included in the transaction request, the second amount being a difference between the loyalty points associated with the merchant identifier stored in the identified user loyalty profile and the loyalty point total required to cover the transaction amount;

transmitting, by the processing server, a response message to the computing system, the response message including an identification of a third amount of loyalty points associated with the merchant identifier that matched the merchant identification included in the transaction request, the third amount being a total of the loyalty point total associated with the matching merchant identifier and the second amount;

receiving, by the computing system, the response message; and processing, by the computing system, the transaction using the third amount of loyalty points.

2. The method of claim 1, wherein the exchanging the first amount of loyalty points for the second amount of loyalty points includes:

identifying, by the processing server, the second amount of loyalty points on a loyalty point exchange, the loyalty point exchange hosting a listing of available loyalty points for exchange associated with each of the one or more merchants wherein the identifying the second amount of loyalty points on a loyalty point exchange includes:

identifying, by the processing server, an exchange rate of loyalty points for the merchant identifier that matched the merchant identification included in the transaction request and loyalty points for the different merchant identifier of the one or more merchant identifiers included in the identified user loyalty profile;

transmitting, by the processing server, an exchange request to the loyalty point exchange, the exchange request including at least the first amount of loyalty points, the user identifier of the identified user loyalty profile, and the merchant identifier that matched the merchant identification included in the transaction request; and receiving, by the processing server, the second amount of loyalty points.

3. The method of claim 2, wherein the loyalty point exchange is a decentralized exchange network; and wherein the decentralized exchange network is a cross-chain network connecting one or more blockchains, each of the one or more blockchains associated with a different merchant and each of the one or more blockchains including user loyalty points associated with each of the different merchants available for exchange via the decentralized exchange network.

4. The method of claim 1, wherein the exchanging the first amount of loyalty points for the second amount of loyalty points is facilitated by a smart contract, the smart contract including one or more conditions for the exchange of the loyalty points associated with the different merchant identifier of the one or more merchant identifiers included in the identified user loyalty profile and the loyalty points associated with the merchant identifier that matched the merchant identification included in the transaction request.

5. The method of claim 2, wherein the loyalty point exchange includes a smart contract associated with each of the one or more merchants, each smart contract including one or more conditions for the exchange of loyalty points of the associated merchant, wherein the one or more conditions of each smart contract includes an exchange on/off condition, wherein the exchange on/off condition defines a threshold number of loyalty points of the associated merchant that can be exchanged in a defined period of time.

6. A system for exchanging loyalty points, comprising:

a computing system, the computing system configured to:

receive transaction data for a transaction, the transaction data including user payment data and an indication of a user selection to pay with loyalty points;

generate a transaction request including a user identification, a merchant identification, and a transaction amount;

transmit the transaction request to the processing server;

a processing server, the processing server configured to:

store a database, the database including one or more user loyalty profiles, each of the one or more user loyalty profiles including at least a user identifier identifying a user and one or more merchant identifiers identifying one or more merchants, each of the one or more merchant identifiers associated with a loyalty point total;

receive the transaction request from the computing system;

execute a query on the database, the query including at least the user identification included in the transaction request;

identify a user loyalty profile including a user identifier that matches the user identification included in the transaction request;

in response to identifying the user loyalty profile, determine the merchant identification included in the transaction request matches one of the one or more merchant identifiers in the identified user loyalty profile;

determine the loyalty point total associated with the matching merchant identifier included in the identified user loyalty profile is lower than a loyalty point total required to cover the transaction amount;

exchange a first amount of loyalty points associated with a different merchant identifier of the one or more merchant identifiers included in the identified user loyalty profile for a second amount of loyalty points associated with the merchant identifier that matched the merchant identification included in the transaction request, the second amount being a difference between the loyalty points associated with the merchant identifier stored in the identified user loyalty profile and the loyalty point total required to cover the transaction amount;

transmit a response message to the first computing system, the response message including an identification of a third amount of loyalty points associated with the merchant identifier that matched the merchant identification included in the transaction request, the third amount being a total of the loyalty point total associated with the matching merchant identifier and the second amount;

receive the response message; and process the transaction using the third amount of loyalty points.

7. The system of claim 6, wherein the exchanging the first amount of loyalty points for the second amount of loyalty points includes the processing server further configured to:

identify the second amount of loyalty points on a loyalty point exchange, the loyalty point exchange hosting a listing of available loyalty points for exchange associated with each of the one or more merchants, wherein the identifying the second amount of loyalty points on a loyalty point exchange includes the processor further configured to:

identify an exchange rate of loyalty points for the merchant identifier that matched the merchant identification included in the transaction request and loyalty points for the different merchant identifier of the one or more merchant identifiers included in the identified user loyalty profile;

transmit an exchange request to the loyalty point exchange, the exchange request including at least the first amount of loyalty points, the user identifier of the identified user loyalty profile, and the merchant identifier that matched the merchant identification included in the transaction request; and receive the second amount of loyalty points.

8. The system of claim 7, wherein the loyalty point exchange is a decentralized exchange network; and wherein the decentralized exchange network is a cross-chain network connecting one or more blockchains, each of the one or more blockchains associated with a different merchant and each of the one or more blockchains including user loyalty points associated with each of the different merchants available for exchange via the decentralized exchange network.

9. The system of claim 6, wherein the exchanging the first amount of loyalty points for the second amount of loyalty points is facilitated by a smart contract, the smart contract including one or more conditions for the exchange of the loyalty points associated with the different merchant identifier of the one or more merchant identifiers included in the identified user loyalty profile and the loyalty points associated with the merchant identifier that matched the merchant identification included in the transaction request.

10. The system of claim 7, wherein the loyalty point exchange includes a smart contract associated with each of the one or more merchants, each smart contract including one or more conditions for the exchange of loyalty points of the associated merchant, wherein the one or more conditions of each smart contract includes an exchange on/off condition, wherein the exchange on/off condition defines a threshold number of loyalty points of the associated merchant that can be exchanged in a defined period of time.

11. The system of claim 7, wherein an exchange rate is based on a total number of loyalty points for the merchant identifier that matched the merchant identification included in the transaction request and the total number of loyalty points for the different merchant identifier of the one or more merchant identifiers included in the identified user loyalty profile that are available for exchange on the loyalty point exchange.

12. A method for accessing data of one or more loyalty programs, comprising:

receiving, by a processing server from a first computing device, a loyalty point transaction request, the loyalty point transaction request including at least a user identification, a first loyalty point amount of first loyalty points, the first loyalty point request amount associated with a first merchant identifier;

executing, by the processing server, a query on a database, the query including at least the user identification included in the loyalty point transaction request;

identifying, by the processing server, a user loyalty profile including the user identification included in the loyalty point transaction request, the user loyalty profile further including at least one merchant identifier matching the first merchant identifier, the merchant identifier associated with a loyalty point total and a loyalty point exchange rate;

determining, by the processing server, a transaction total for the loyalty point transaction request, the transaction total based on the loyalty point exchange rate and the first loyalty point request amount; and executing, by the processing server, a loyalty point transaction, wherein executing the loyalty point transaction includes:

transmitting, by the processing server to the first computing device, the first loyalty points equal the first loyalty point request amount, and transmitting, by the processing server to a second computing device, a transaction amount equal to the transaction total.

13. The method of claim 12, wherein prior to the executing the loyalty point transaction, the method further comprises:

transmitting, by the processing server to the first computing device, the transaction total; and receiving, by the processing server from the first computing device, an approval of the transaction total and a transaction amount equal to the transaction total.

14. The method of claim 12, wherein the exchange rate is a cryptocurrency value of each first loyalty point and the transaction total is a cryptocurrency amount equal to the first loyalty point request amount based on the exchange rate.

15. The method of claim 12, wherein the exchange rate is a value of second loyalty points associated with a second merchant identifier equal to each first loyalty point associated with the first merchant identifier and the transaction total is a second loyalty point amount equal to the first loyalty point request amount based on the exchange rate.

16. The method of claim 12, further comprising:

storing, by the processing server, a smart contract associated the merchant identifier, the smart contract including one or more conditions for the exchange of loyalty points of the associated merchant; and wherein the one or more conditions of the smart contract includes an exchange on/off condition, wherein the exchange on/off condition defines a threshold number of loyalty points of the associated merchant that can be exchanged in a defined period of time.

17. A system for exchanging loyalty points, comprising:

a first computing system;

a second computing system; and a processing server, the processing server configured to:

receive, from a first computing device, a loyalty point transaction request, the loyalty point transaction request including at least a user identification, a first loyalty point amount of first loyalty points, the first loyalty point request amount associated with a first merchant identifier;

execute a query on a database, the query including at least the user identification included in the loyalty point transaction request;

identify a user loyalty profile including the user identification included in the loyalty point transaction request, the user loyalty profile further including at least one merchant identifier matching the first merchant identifier, the merchant identifier associated with a loyalty point total and a loyalty point exchange rate;

determine a transaction total for the loyalty point transaction request, the transaction total based on the loyalty point exchange rate and the first loyalty point request amount; and execute a loyalty point transaction, wherein executing the loyalty point transaction includes:

transmit, to the first computing device, the first loyalty points equal the first loyalty point request amount, and transmit, to the second computing device, a transaction amount equal to the transaction total.

18. The system of claim 17, wherein prior to the executing the loyalty point transaction, the processing server is further configured to:

transmit, to the first computing device, the transaction total; and receive, from the first computing device, an approval of the transaction total and a transaction amount equal to the transaction total.

19. The system of claim 17, wherein the exchange rate is a value of second loyalty points associated with a second merchant identifier equal to each first loyalty point associated with the first merchant identifier and the transaction total is a second loyalty point amount equal to the first loyalty point request amount based on the exchange rate.

20. The system of claim 17, wherein the processing server is further configured to:

store a smart contract associated the merchant identifier, the smart contract including one or more conditions for the exchange of loyalty points of the associated merchant; and wherein the one or more conditions of the smart contract includes an exchange on/off condition, wherein the exchange on/off condition defines a threshold number of loyalty points of the associated merchant that can be exchanged in a defined period of time.

* * * * *